US009629052B2

United States Patent
Okita et al.

(10) Patent No.: US 9,629,052 B2
(45) Date of Patent: Apr. 18, 2017

(54) TRAFFIC MANAGEMENT SERVER

(71) Applicant: Hitachi, Ltd., Tokyo (JP)

(72) Inventors: Hideki Okita, Tokyo (JP); Rintaro Katayama, Tokyo (JP); Hiroto Nakagawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 61 days.

(21) Appl. No.: 14/692,874

(22) Filed: Apr. 22, 2015

(65) Prior Publication Data

US 2015/0312827 A1    Oct. 29, 2015

(30) Foreign Application Priority Data

Apr. 23, 2014   (JP) ................. 2014-088680

(51) Int. Cl.
*H04W 36/00* (2009.01)
*H04W 36/22* (2009.01)
*H04W 28/02* (2009.01)
*H04L 12/825* (2013.01)

(52) U.S. Cl.
CPC .......... *H04W 36/22* (2013.01); *H04L 47/263* (2013.01); *H04W 28/0226* (2013.01); *H04W 28/0289* (2013.01); *H04W 36/0055* (2013.01); *H04W 36/0066* (2013.01)

(58) Field of Classification Search
CPC ............ H04W 36/22; H04W 36/0055; H04W 36/0066; H04W 28/0226; H04W 28/0289; H04L 47/263
USPC ....................... 455/438, 436, 452.2
See application file for complete search history.

(56) References Cited

U.S. PATENT DOCUMENTS

| 9,271,207 | B1* | 2/2016 | Narendran | ............ H04W 36/14 |
| 2009/0029645 | A1* | 1/2009 | Leroudier | ............ H04B 7/2606 455/7 |
| 2011/0019639 | A1* | 1/2011 | Karaoguz | ......... H04W 36/0055 370/331 |
| 2011/0051683 | A1* | 3/2011 | Ramankutty | ..... H04W 36/0033 370/331 |
| 2011/0143674 | A1* | 6/2011 | Lim | .................... H04W 72/082 455/63.1 |
| 2011/0261788 | A1* | 10/2011 | Wang | .................... H04W 76/06 370/331 |
| 2012/0208540 | A1* | 8/2012 | Kim | .................. H04W 36/0094 455/436 |
| 2013/0067112 | A1 | 3/2013 | Delos Reyes et al. | |

(Continued)

FOREIGN PATENT DOCUMENTS

JP        2003-111135 A    4/2003

OTHER PUBLICATIONS

Extended European Search Report received in corresponding European Application No. 15164459.8 dated Sep. 16, 2015.

(Continued)

*Primary Examiner* — Mong-Thuy Tran
(74) *Attorney, Agent, or Firm* — Mattingly & Malur, PC

(57) ABSTRACT

A traffic management server is configured to determine a base station at which a handover occurs to a base station having a slower maximum communication speed as an area boundary base station, determine a terminal located within a coverage of the area boundary base station, and instruct a control apparatus included in a mobile network to limit a maximum usable bandwidth of the determined terminal.

11 Claims, 24 Drawing Sheets

(56) References Cited

U.S. PATENT DOCUMENTS

| | | | | |
|---|---|---|---|---|
| 2013/0100795 A1* | 4/2013 | Zhao | ............... | H04W 36/0016 |
| | | | | 370/216 |
| 2013/0114408 A1* | 5/2013 | Sastry | ................. | H04W 28/02 |
| | | | | 370/231 |
| 2013/0225181 A1* | 8/2013 | Radulescu | ............ | H04W 36/22 |
| | | | | 455/442 |
| 2016/0112896 A1* | 4/2016 | Karampatsis | ..... | H04W 28/0252 |
| | | | | 370/230.1 |

OTHER PUBLICATIONS

"E-UTRAN—eHRPD Connectivity and Interworking: Core Network Aspects", 3GPP2 Draft; X. S0057-B, 3rd Generation Partnership Project 2, 3GPP2, Sep. 9, 2013, pp. 1-281, vol. TSGSX No. v1.1, Arlington, VA.

"3rd Generation Partnership Project; Technical Specification Group Radio Access Mobility between E-UTRAN and 3GPP2/Mobile WiMAX Radio Technologies (Release 9)", 3GPP Standard; 3GPP TR 36.938, 3rd Generation Partnership Project (3GPP), Mobile Competence Centre, Dec. 21, 2009, pp. 1-34, No. V9.0.0, France.

\* cited by examiner

| TIME | UE ID (IMSI) | SOURCE BASE STATION ID (ECGI) | TARGET RAT |
|---|---|---|---|
| 2014/04/17 09:47:25 | 440 99 1234567890 | 440 99 0000001 255 | NON-3GPP |
| 2014/04/17 09:49:41 | 440 99 1234567891 | 440 99 0000001 255 | NON-3GPP |
| 2014/04/17 09:52:04 | 440 99 1234567892 | 440 99 0000001 255 | NON-3GPP |
|  |  |  |  |

*FIG. 6*

| TIME | AREA BORDER BASE STATION ID (ECGI) | HAND-DOWN FREQUENCY (TIMES PER HOUR) | HAND-DOWN/HAND-OVER RATIO |
|---|---|---|---|
| 2014/04/17 09:52:04 | 440 99 0000001 255 | 3 | 100% |
|  |  |  |  |

*FIG. 7*

| TIME | UE ID (IMSI) | S11 MME-SIDE TEID | UE IP ADDRESS | ECGI |
|---|---|---|---|---|
| 2014/04/17 10:37:02 | 440 99 1234567893 | 0x00000001 | 192.168.100.13 | 440 99 0000001 255 |
| 2014/04/17 10:38:10 | 440 99 1234567894 | 0x00000002 | 192.168.100.14 | 440 99 0000001 255 |
| 2014/04/17 10:39:10 | 440 99 1234567895 | 0x00000003 | 192.168.100.15 | 440 99 0000001 255 |
| 2014/04/17 10:39:56 | 440 99 1234567896 | 0x00000004 | 192.168.100.16 | 440 99 0000002 255 |
|  |  |  |  |  |

*FIG. 8*

| TIME | UE ID (IMSI) | UE IP ADDRESS | ECGI |
|---|---|---|---|
| 2014/04/17 10:37:02 | 440 99 1234567893 | 192.168.100.13 | 440 99 0000001 255 |
| 2014/04/17 10:38:10 | 440 99 1234567894 | 192.168.100.14 | 440 99 0000001 255 |
| 2014/04/17 10:39:10 | 440 99 1234567895 | 192.168.100.15 | 440 99 0000001 255 |
| | | | |

*FIG. 9*

| TIME | UE ID (IMSI) | UE IP ADDRESS |
|---|---|---|
| 2014/04/17 10:37:02 | 440 99 1234567893 | 192.168.100.13 |
| 2014/04/17 10:38:10 | 440 99 1234567894 | 192.168.100.14 |
| 2014/04/17 10:39:10 | 440 99 1234567895 | 192.168.100.15 |
| | | |

*FIG. 10*

| UE ID (IMSI) | LTE-A | LTE | HSPA+ | eHRPD |
|---|---|---|---|---|
| 440 99 1234567893 | UNSUPPORTED | SUPPORTED | SUPPORTED | UNSUPPORTED |
| 440 99 1234567894 | UNSUPPORTED | SUPPORTED | UNSUPPORTED | SUPPORTED |
| | | | | |

*FIG. 11*

Comparative Example

| Time | UE ID (IMSI) | Source Base Station ID (ECGI) | Target RAT |
|---|---|---|---|
| 2014/04/17 09:47:25 | 440 99 1234567890 | 440 99 0000001 255 | UTRAN |
| 2014/04/17 09:49:41 | 440 99 1234567891 | 440 99 0000001 255 | UTRAN |
| 2014/04/17 09:52:04 | 440 99 1234567892 | 440 99 0000001 255 | UTRAN |
| | | | |

| TIME | UE ID (IMSI) | UE IP ADDRESS | ALLOCATED BANDWIDTH |
|---|---|---|---|
| 2014/04/17 10:37:02 | 440 99 1234567893 | 192.168.100.13 | 10Mbps |
| 2014/04/17 10:38:10 | 440 99 1234567894 | 192.168.100.14 | 5Mbps |
| | | | |

| TIME | UE ID (IMSI) | HSGW ID (IP ADDRESS) |
|---|---|---|
| 2014/04/17 09:47:25 | 440 99 1234567890 | 192.168.200.10 |
| 2014/04/17 09:49:41 | 440 99 1234567891 | 192.168.200.10 |
| 2014/04/17 09:52:04 | 440 99 1234567892 | 192.168.200.10 |
| | | |

*FIG. 28*

| TIME | UE ID (IMSI) | S11 MME-SIDE TEID | UE IP ADDRESS | ECGI |
|---|---|---|---|---|
| 2014/04/17 09:37:02 | 440 99 1234567890 | 0x00000011 | 192.168.100.10 | 440 99 0000001 255 |
| 2014/04/17 09:38:10 | 440 99 1234567891 | 0x00000012 | 192.168.100.11 | 440 99 0000001 255 |
| 2014/04/17 09:39:10 | 440 99 1234567892 | 0x00000013 | 192.168.100.12 | 440 99 0000001 255 |
| | | | | |

*FIG. 29*

| TIME | AREA BORDER BASE STATION ID (ECGI) | ROAMING FREQUENCY (TIMES PER HOUR) | ROAMING/HAND-OVER RATIO |
|---|---|---|---|
| 2014/04/17 09:52:04 | 440 99 0000001 255 | 3 | 100% |
| | | | |

*FIG. 30*

| IP ADDRESS BLOCK | OPERATOR | LTE-A | LTE | HSPA+ | eHRPD |
|---|---|---|---|---|---|
| 192.168.200.0/24 | OPR-B | UNSUPPORTED | UNSUPPORTED | UNSUPPORTED | SUPPORTED |
| | | | | | |

*FIG. 31*

TRAFFIC MANAGEMENT SERVER

CLAIM OF PRIORITY

The present application claims priority from Japanese patent application JP2014-88680 filed on Apr. 23, 2014, the content of which is hereby incorporated by reference into this application.

BACKGROUND

The mobile phone communication network (hereinafter, mobile network) of a mobile telephone service provider (hereinafter, mobile business operator) includes a plurality of network nodes. A mobile phone terminal of a mobile phone service subscriber (hereinafter, subscriber) transmits and receives packet data to and from an external network such as the Internet, or the like, via the plurality of network nodes.

The mobile service providers work on maintaining the quality of packet data communication experienced by the subscribers by analyzing and controlling the traffic at the mobile network. For example, JP 2003-111135 A discloses a wireless network control apparatus designed to improve the connectivity to the mobile network, wherein when congestion in the mobile network is detected, the volume of traffic inflow from the mobile telephone terminals causing the congestion is reduced by reducing the number of RNC wireless links comprising the mobile network so as to limit the above stated congestion in order to improve the connectivity of other mobile telephone terminals connecting to the mobile network.

SUMMARY

Meanwhile, lowered quality of packet data communication experienced by the subscribers may be caused by reasons other than the traffic congestion caused by the increase in the traffic of mobile telephone terminals transmitting data. For example, deterioration of the packet data communication experienced by the subscribers may be due to handovers. To be more specific, when a subscriber moves from one place to another while conducting a packet data communication, a handover may occur in which the mobile telephone terminal connected to a mobile telephone base station (hereinafter, base station) will be connected to another base station adjacent to the previous base station.

Then, when the handover occurs and when the maximum communication speed between the another base station and the mobile telephone terminal is slower than the maximum communication speed between the base station to which the mobile telephone terminal was connected prior to the movement and the mobile telephone terminal, a great deal of packet loss can occur between the core network of the mobile network and the wireless access network of the mobile network (access network), or between the mobile telephone terminal and the base station. Then when the mobile telephone terminal, the network node, and/or a server of an external network detect the packet loss and retransmit the packet traffic congestion will be generated. Such congestion will appear to the subscribers as though packet data communication was not properly executed, and therefore, the quality of the packet data communication experienced by the subscribers will be deteriorated greatly.

In view of such problem, the present invention aims to reduce the traffic congestion, which is generated at a mobile network, when a handover to a base station having a slower maximum communication speed occurs to a mobile telephone terminal of a subscriber that is located between two base stations, each having maximum communication speed vastly different from one another.

A representative example of the present invention is a traffic management server including a memory storing programs and a processor configured to operate in accordance with the programs. The processor is configured to determine a base station at which a handover occurs to a base station having a slower maximum communication speed as an area boundary base station, determine a terminal located within a coverage of the area boundary base station, and instruct a control apparatus included in a mobile network to limit a maximum usable bandwidth of the determined terminal.

By virtue of the above stated traffic management server, it becomes possible for the mobile business operators to reduce the congestion occurring at a mobile network when a handover to one of the two base stations having a slower maximum communication speed occurs to a mobile telephone terminal of a subscriber located between two base stations, each having maximum communication speed vastly different from one another. By this, the mobile business operators will be able to improve the quality of packet data communication experienced by the subscribers using the mobile telephone terminals to which the handover occurs.

Objects, configurations, and effects of this invention other than those described above will be clarified in the description of the following embodiments.

BRIEF DESCRIPTION OF THE DRAWINGS

FIG. 6 illustrates an example of the configuration of the handover history information of the TMS;

FIG. 7 illustrates an example of a configuration of the area boundary base station information of the TMS;

FIG. 8 illustrates an example of a configuration of the subscriber information within base station of the TMS;

FIG. 9 illustrates an example of a configuration of the subscriber information within area boundary base station of the TMS;

FIG. 10 illustrates an example of a configuration of the bandwidth limited subscriber information of the TMS;

FIG. 11 illustrates an example of a configuration of the terminal type information;

FIG. 28 illustrates an example of a configuration of the roaming history information of the TMS;

FIG. 29 illustrates an example of a configuration of the subscriber information within area boundary base station of the TMS;

FIG. 30 illustrates an example of a configuration of the area boundary base station information of the TMS;

FIG. 31 illustrates an example of a configuration of roaming business operator information of the TMS;

DETAILED DESCRIPTION OF THE EMBODIMENTS

Figure 1:
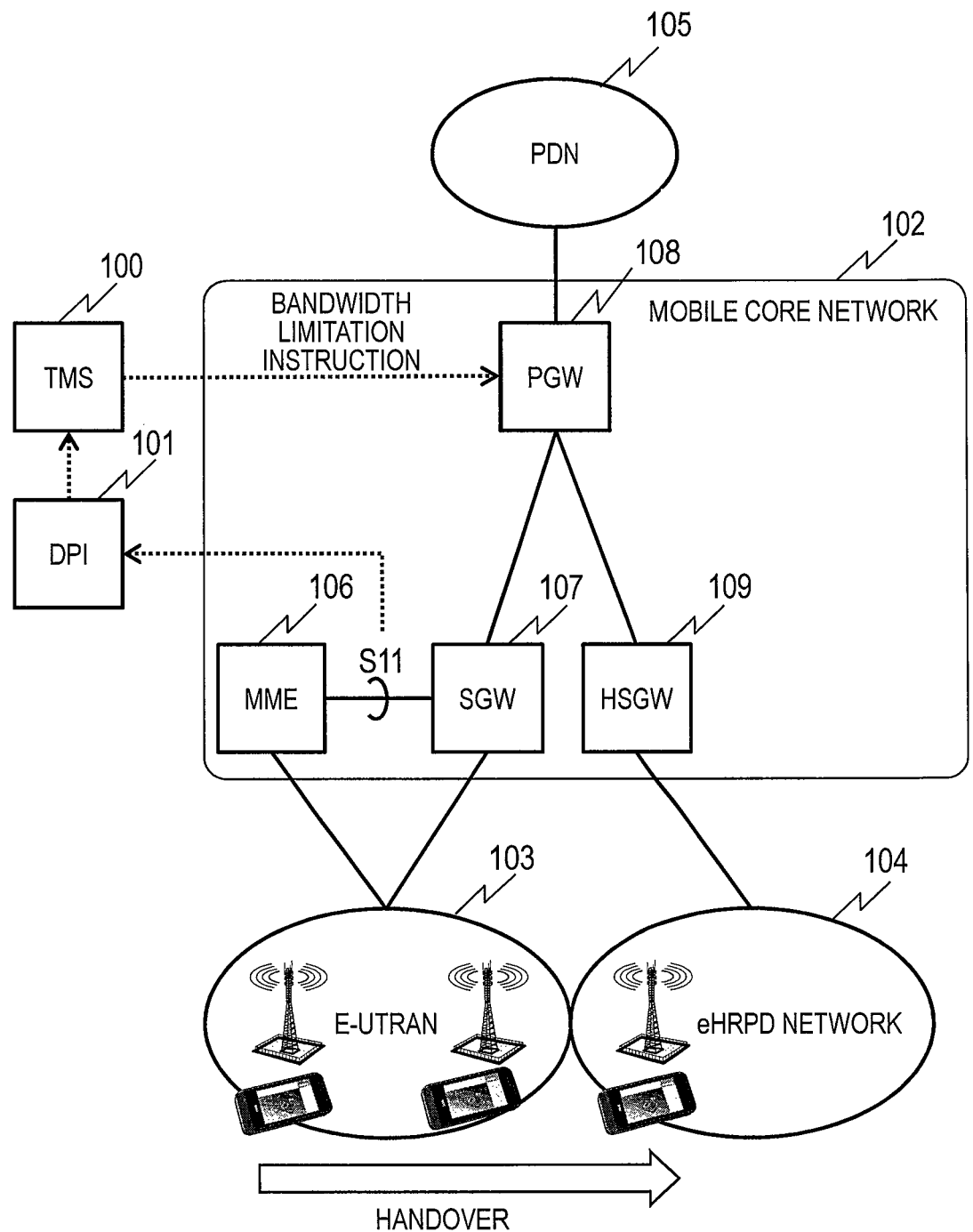
FIG. 1 illustrates an example of a configuration of an entire network system.

Hereinafter, embodiments of the present invention will be described in detail with reference to accompanying drawings.

It is to be noted the description of the embodiments herein may include, as a matter of convenience, a description of multiple sections of the present invention or an embodiment split in multiple sections in accordance with the actual embodiment, however, unless specifically indicated, they are not necessarily irrelevant to each other, and they may compliment one section, or another, or an entire modification of the embodiment, or they may supply detailed supplemental description of the present invention.

Also note that in the following description of the embodiments of the present invention, the number of elements described herein (including unit number, numerical value, quantity, scope of an object, etc.) shall not be limited to and may include a greater value or a smaller value of a particular number referred to in the description except for a particular occasion or a principle requiring a specific number.

Furthermore, it goes without saying that in the following description of the embodiments of the present invention, the components (including element steps, or the like) may not necessarily be indispensable from the present invention unless the components referred to hereinbelow are prerequisite for a particular occasion or a principle requiring the same.

Characteristics of the traffic management server according to the present embodiment will be briefly described below. The traffic management server obtains a control message, which travels between network nodes included in a mobile network and indicates a new connection of a mobile telephone terminal, and a control message, which indicates an occurring handover between two base stations. The traffic management server creates, based on the information included in the above stated control messages, a list of base stations (hereinafter, area boundary base stations) at which the handover to the base station having a slower maximum communication speed occur. The traffic management server creates, based on the above stated control message, a list of connection destination base stations for each mobile telephone terminal currently connected to the mobile network. The traffic management server creates, based on the list of area boundary base stations and the list of connection destination base stations, a list of mobile telephone terminals currently connected the area boundary base stations out of the mobile telephone terminals currently connected to the above stated mobile network. The traffic management server sends an instruction to the network nodes of the mobile network to limit the maximum usable bandwidth for each mobile telephone terminal currently connected to the above stated area boundary base station.

According to the present embodiment, an embodiment of the traffic management server when a handover to a subscriber's mobile telephone terminal from a 3GPP E-UTRAN wireless access network to a 3GPP2 eHRPD wireless access network takes place will be described.

FIG. 1 illustrates an example of a configuration of an entire network system according to the present embodiment. The present system includes a traffic management server 100 (hereinafter, "TMS"), a packet detailed analysis apparatus 101 (hereinafter, DPI), a mobile core network 102, an E-UTRAN wireless access network 103 designed to accommodate therein a mobile telephone terminal (hereinafter, E-UTRAN), an eHRPD wireless access network 104 designed to accommodate therein a mobile telephone terminal (hereinafter, eHRPD network), and a packet data network 105 (hereinafter, PDN). Further, the mobile core network includes an MME 106 (Mobility Management Entity), an SGW 107 (Serving Gateway), a PGW 108 (Packet data network Gateway), and an HSGW 109 (HRPD Serving Gateway). The MME is a communication apparatus designed to accommodate one or a plurality of base stations to provide mobility control. The MME manages bearers between a mobile telephone terminal and the PGW. In an event of an attach or a handover to the mobile telephone terminal the MME selects the SGW for the terminal. The SGW and the HSGW are gateway designed to accommodate one or a plurality of base stations and transmit user data between the PGW and the base station. The PGW is a gate way designed to include an interface with the PDN. The PGW is designed to assign an IP address to the mobile telephone terminal.

The above stated DPI, which is an analysis apparatus designed to analyze packets over a network, monitors an S11 I/F which connects the above stated MME with the above stated SGW. Further, the DPI transmits a control message obtained from the I/F to the TMS.

Further, the above stated TMS determines, based on the control message received from the DPI, the mobile telephone terminals located within the coverage of the base station to which a handover from the E-UTRAN to the eHRPD network is occurring, and sends an instruction to the PGW so as to limit the usable bandwidth for each mobile telephone terminal.

Note, an exemplary configuration where the DPI monitors the S11 I/F as a means by which the TMS monitors the system behavior of the mobile network is described in the present embodiment. Such configuration is more effective compared with a configuration where the DPI monitors every E-UTRAN base station in that the configuration according to the present embodiment is operable to reduce the number of monitoring points for the mobile business operators thereby reducing the equipment cost and the operational cost associated with the monitoring activities.

Figure 2:
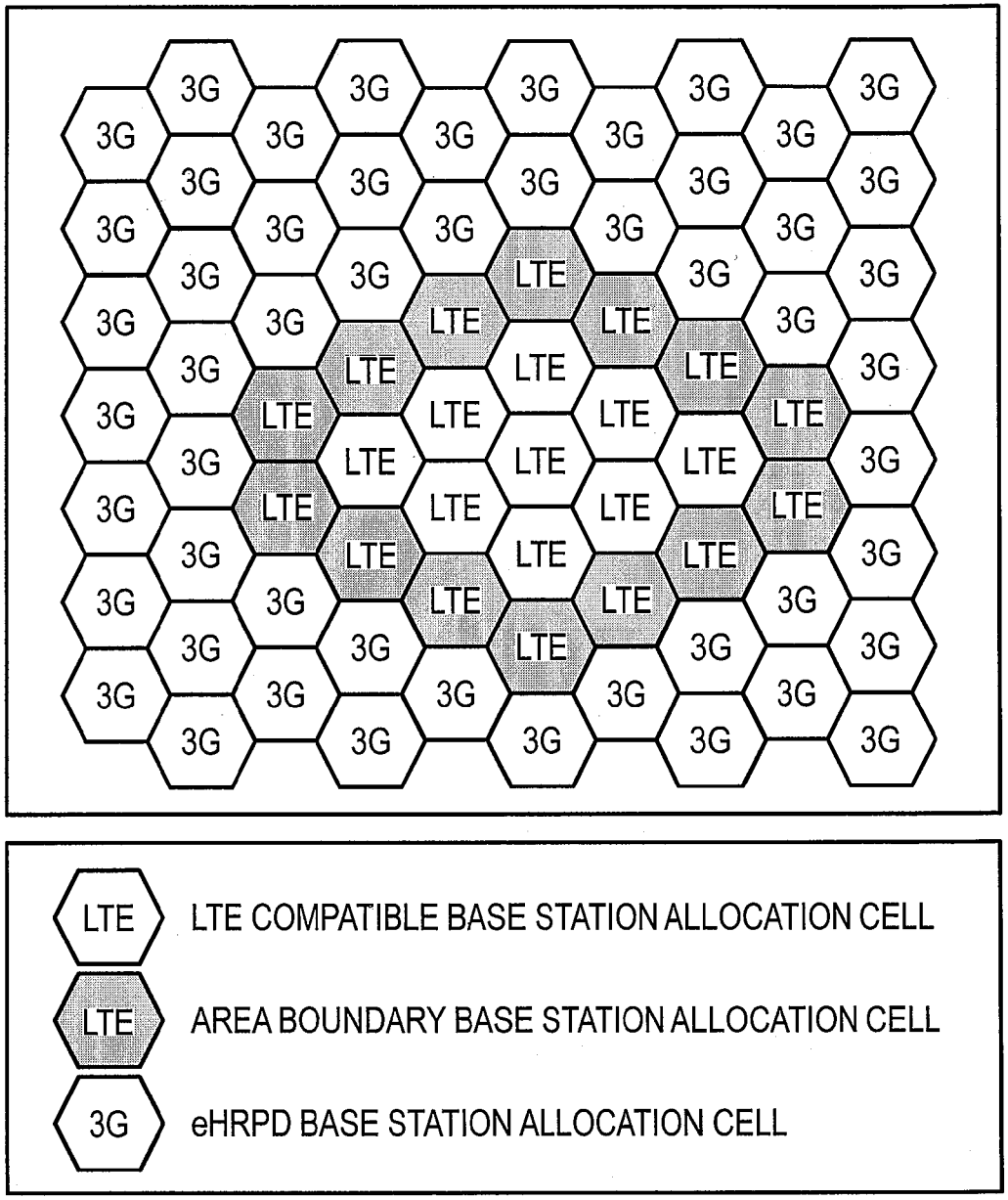
FIG. 2 illustrates an example of a configuration of base station allocation of the mobile business operator.

FIG. 2 illustrates an example of a configuration of base station allocation of the mobile business operator according to the present embodiment. This example depicts the cells (hereinafter, LTE cell) showing the allocation of LTE compatible base station at the center thereof with the cells (hereinafter, eHRPD cells) showing the allocation of eHRPD base stations surrounding the outside of the LTE cells. Here, the LTE cells that adjoin the above stated eHRPD cells are defined and depicted as area boundary base station allocation cells (hereinafter, area boundary cells). Generally speaking, handovers from the LTE base station to the eHRPD base station are more likely to occur to the subscribers' mobile telephone terminals at the base station (hereinafter, area boundary base station) corresponding to the area boundary base station allocation cells because of their adjoining location with the eHRPD cells.

Figure 3:
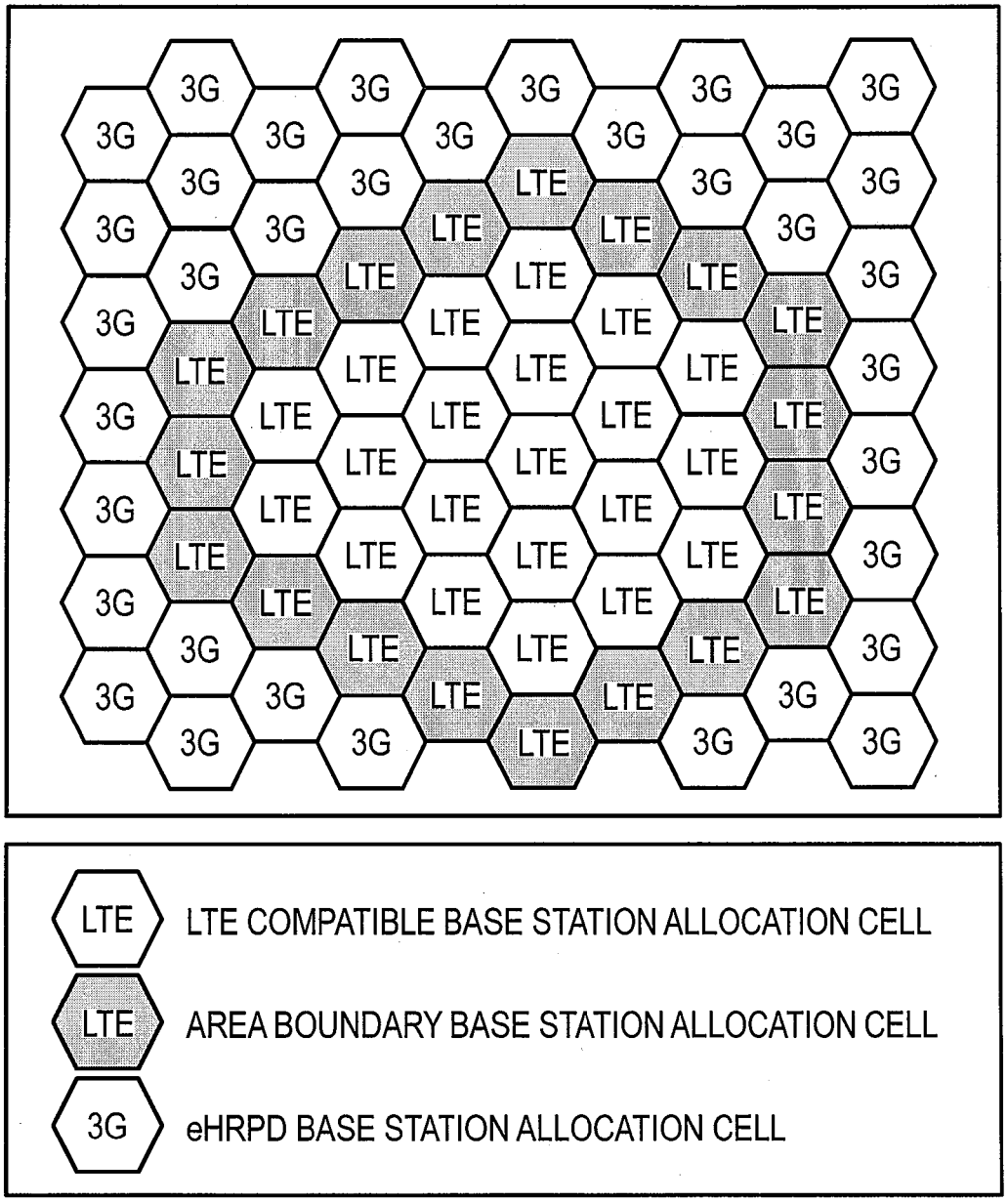
FIG. 3 illustrates the base station allocation of the mobile business operator illustrated in FIG. 2 after some changes are made thereto.

FIG. 3 illustrates the base station allocation of the mobile business operator illustrated in FIG. 2 after some changes are made thereto. For example, when the mobile business operator continues to install more LTE compatible base stations, the eHRPD cells shown in FIG. 2 will be replaced with the LTE cells. Then the cells previously defined as the area boundary cells may include cells that no longer adjoin the eHRPD cells. In such case, the cells which were newly replaced from the eHRPD cell to the LTE cell may become the area boundary cell.

Figure 4:
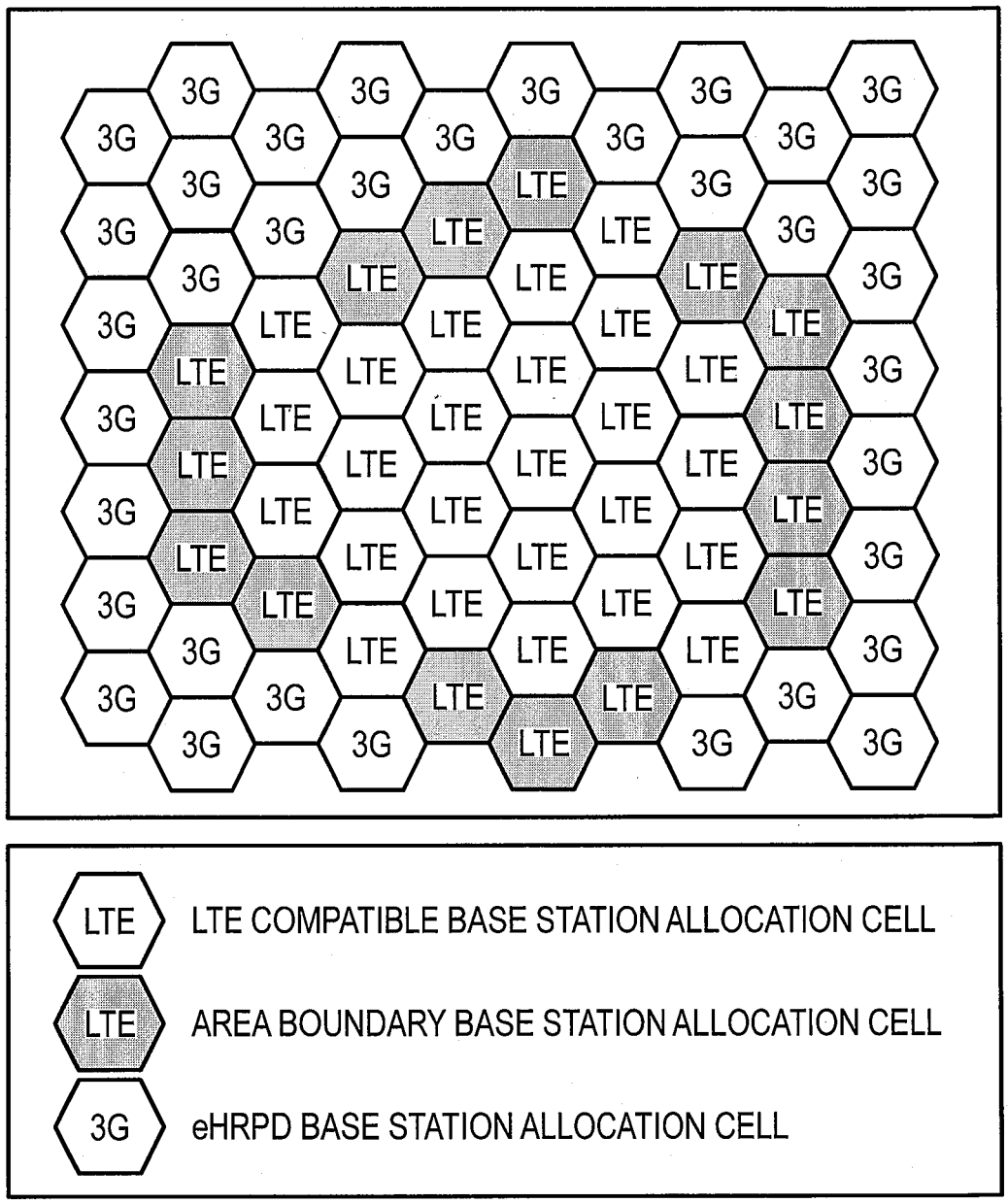
FIG. 4 illustrates the updated base station allocation of the mobile business operator illustrated in FIG. 3 in light of more closely resembling the actual situation.

FIG. 4 illustrates the updated base station allocation of the mobile business operator illustrated in FIG. 3 in light of the situation more closely resembling the actual situation. In the actual wireless access network of the mobile business operator, there are occasions where handovers from the LTE base stations to the eHRPD base stations are less likely to occur even though, as far as the cell allocation is concerned, the LTE cells appear to be adjoining to the eHRPD cells. For example, when physical barriers such as mountains and rivers exist between the LTE cells and he eHRPD cells, mobile telephone terminals are less likely to move between the LTE cells and he eHRPD cells. In such case, it could be problematic to rely solely on the information concerning the physical locations of the base stations to predict the probability of the occurrence of handovers. Accordingly, means to determine the area boundary cells in an automatic manner is required.

Figure 5:
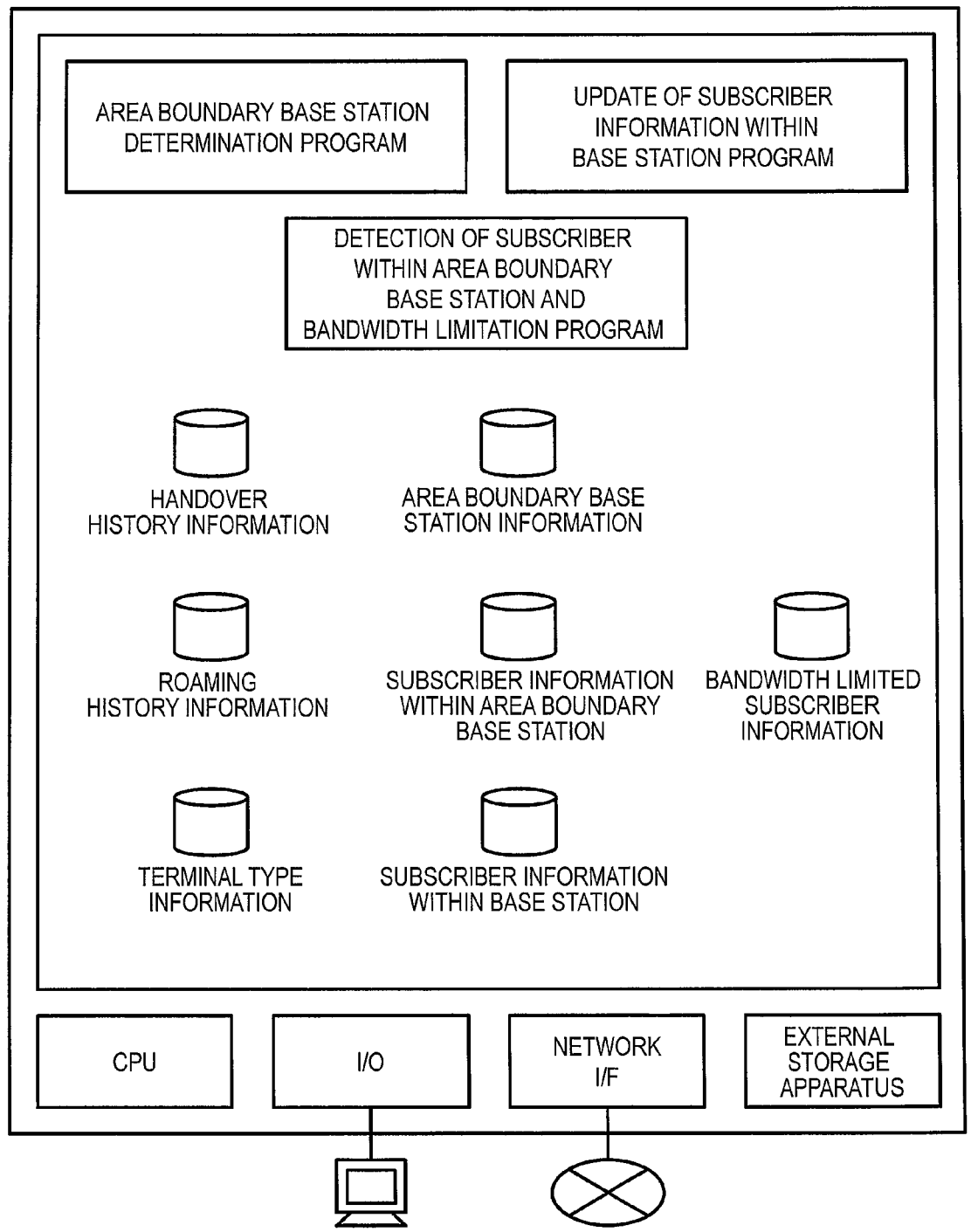
FIG. 5 illustrates an example of a configuration of the TMS.

FIG. 5 illustrates an example of a configuration of the TMS according to the present embodiment. The features of the TMS according to the present embodiment are stored as program software in a non-transitory computer readable storage medium of an external storage apparatus for a general type of computer, developed on the memory, and executed by the CPU (processor). Further, the TMS communicates with the above stated DPI and PGW via a network I/F. The memory of the TMS stores therein an area boundary base station determination process program, an update of subscriber information within base station program, and a detection of subscriber within area boundary base station and bandwidth limitation program. The programs contain instructions to cause the CPU to perform prescribed processings. Further the memory of the TMS stores therein handover history information, roaming history information, terminal type information, area boundary base station information, subscriber information within area boundary base station, subscriber information within base station, and bandwidth limited subscriber information.

Note, the example according to the present embodiment depicts a configuration where the above stated programs and the above stated information are stored at the memory of a single computer. However, the example according to the present embodiment may include a configuration where the above stated information is stored at an external storage apparatus, retrieved from the external storage apparatus each time the above stated program is processed, and stored back at the external storage apparatus upon the completion of the process.

Further, the above stated programs and the above stated information may be stored at a plurality of computers in a distributed manner. For example, each of the above stated information may be implemented in a table in a relational database apart from the database of the TMS, and referenced and updated by the above stated program executed at the TMS.

Furthermore, the above stated information may be stored at a key-value store server of a distributed type apart from the TMS, where the above stated program executed at the TMS references and updates the above stated information at the key-value store server.

It is to be noted that the difference in the method of storing the above stated information has no influence on the substantial aspect of the present invention.

FIG. 6 illustrates an example of the configuration of the handover history information of the TMS according to the present embodiment. The TMS uses this information in order to manage as to whether or not a handover occurred to a subscriber's mobile telephone terminal at a particular base station of multiple base stations of the mobile business operator. Each entry of this information includes a combination of time in which the entry is newly created or time in which the TMS detects a handover occurred to the subscriber's mobile phone terminal, an identifier of the subscriber's mobile phone terminal (hereinafter, IMSI), an identifier of an original base station of the subscriber's mobile phone terminal prior to the motion thereof (hereinafter, ECGI), and a type of a wireless access technology (hereinafter, RAT: Radio Access Technology) of a base station at the destination of the motion of the subscriber's mobile phone terminal.

The example according to the present embodiment includes "Non-3GPP" for the wireless access technology for the destination base station for each entry, and the handovers take place to 3 units of subscribers' mobile telephone terminals from the LTE cell to the eHRPD cell after the TMS starts monitoring the 3 units.

FIG. 7 illustrates an example of a configuration of the area boundary base station information of the TMS according to the present embodiment. The TMS uses this information in order to manage as to which base station out of multiple base stations of the mobile business operator is the area boundary base station. Each entry of this information includes a combination of time in which the entry is newly created, an identifier of the base station determined as the area boundary base station, and the ratio of the number of occurrences of handovers to the eHRPD base station with respect to the number of handovers occurred within a predetermined amount of time at the area boundary base station corresponding to the entry.

FIG. 8 illustrates an example of a configuration of the subscriber information within base station of the TMS according to the present embodiment. The TMS uses this information in order to manage as to under which base station's coverage the subscriber's mobile telephone terminal is located. Each entry of this information includes a combination of time in which the TMS detects a subscriber within a coverage, an identifier of the subscriber's mobile telephone terminal, a tunnel endpoint identifier (hereinafter, TEID) of the S11 I/F on the MME side, an IP address assigned to the subscriber's mobile telephone terminal, and an identifier (ECGI) of the base station under the coverage of which the subscribers mobile telephone terminal is located.

FIG. 9 illustrates an example of a configuration of the subscriber information within area boundary base station of the TMS according to the present embodiment. The TMS uses this information in order to manage the subscriber's mobile telephone terminal located within the coverage of the area boundary base station. Each entry of this information includes a combination of time in which the TMS either creates or updates the entry, the IMSI of the subscriber's mobile telephone terminal located within the coverage of the area boundary base station, an IP address assigned to the subscriber's mobile telephone terminal located within the coverage of the area boundary base station, and the ECGI of the area boundary base station under the coverage of which the subscriber's mobile telephone terminal.

FIG. 10 illustrates an example of a configuration of the bandwidth limited subscriber information of the TMS according to the present embodiment. The TMS uses this information in order to manage the subscriber's mobile telephone terminal which is located under the coverage of the area boundary base station and which is subject to the bandwidth limitation by the PGW. Each entry of this information includes a combination of time in which the TMS either creates or updates the entry, the IMSI of the subscriber's mobile telephone terminal subject to the bandwidth limitation by the PGW, and an IP address assigned to the subscriber's mobile telephone terminal.

FIG. 11 illustrates an example of a configuration of the terminal type information according to the present embodiment. The TMS uses this information in order to manage each type of the wireless access network corresponding to each subscriber's mobile telephone terminal. Each entry of this information combinations of the IMSI, an identifier indicating the compatibility with LTE-A, an identifier indicating the compatibility with LTE, an identifier indicating the compatibility with HSPA+, and an identifier indicating the compatibility with eHRPD.

The mobile telephone terminal corresponding to the first entry in FIG. 11 is compatible with LTE and HSPA+. That is, a handover will occur to this mobile telephone terminal from the LTE cell to the cell of the base station corresponding to the HSPA+. On the other hand, the mobile telephone terminal corresponding to the second entry in FIG. 11 is compatible with LTE and eHRPD. That is, a handover will occur to this mobile telephone terminal from the LTE cell to the eHRPD cell.

The TMS, by referencing the terminal type information, becomes operable to designate usable bandwidth in a selective manner in accordance with the type of each subscriber's mobile telephone terminal to the subscriber's mobile telephone terminal located within the coverage of the area boundary base station. For example, it becomes possible to apply a bandwidth limitation wider than a mobile telephone terminal of the eHRPD system to a mobile telephone terminal of the HSPA+ system having a theoretical maximum communication speed higher than that of the eHRPD system.

Figure 12:
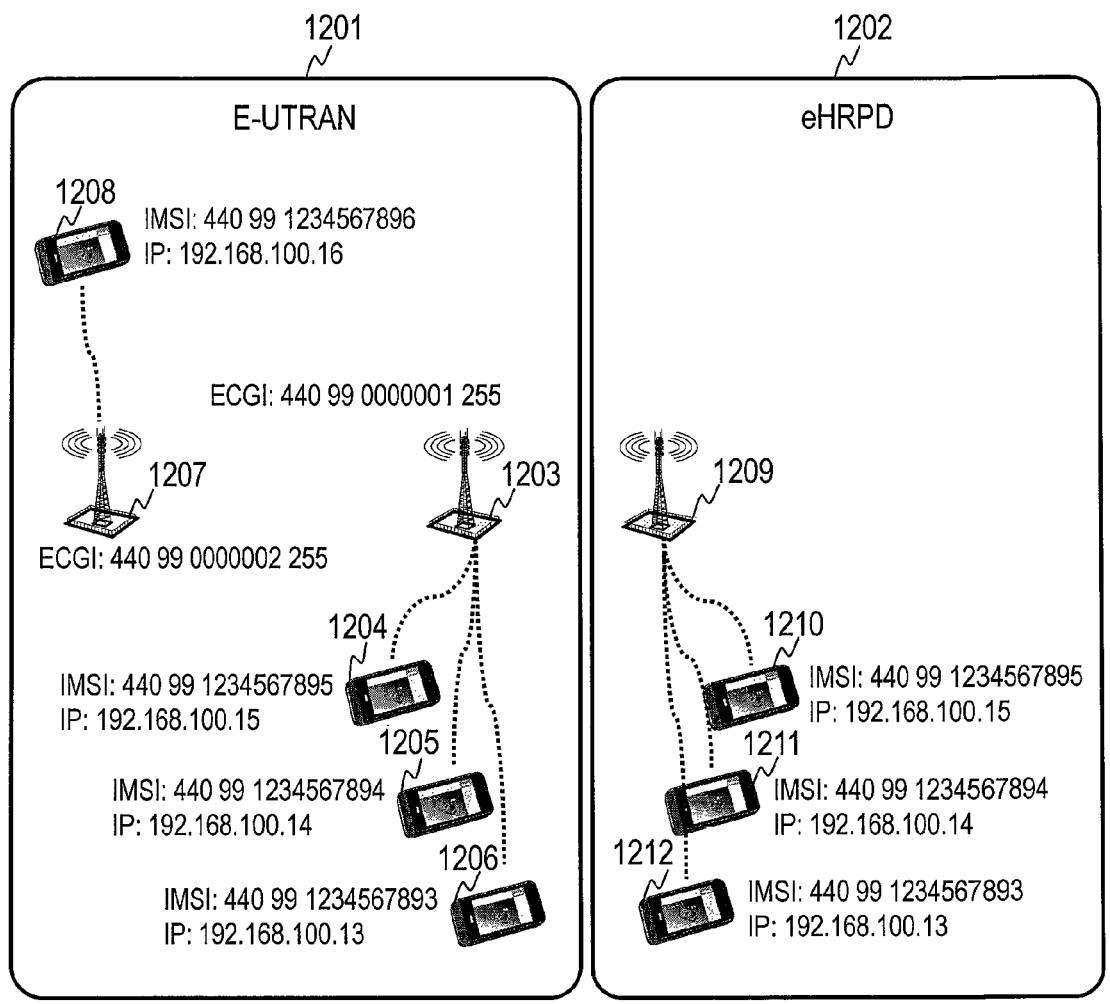
FIG. 12 illustrates an example of the location status of subscriber's mobile telephone terminal under the coverage of the base station.

FIG. 12 illustrates an example of the location status of subscriber's mobile telephone terminal under the coverage of the base station according to the present embodiment. Under the coverage of an LTE base station 1203 of an E-UTRAN 1201, there are 3 units of subscribers' mobile telephone terminals 1204 to 1206. Further, under the coverage of an LTE base station 1207, there is 1 unit of a subscriber's mobile telephone terminal 1208. Further, under the coverage of an eHRPD base station 1209 of an eHRPD network 1202, there are 3 units of subscribers' mobile telephone terminals 1210 to 1212. According to the present example, it is assumed that a handover occurred to the 3 units of subscribers' mobile telephone terminals 1210 to 1212 from the LTE base station 1203 of the E-UTRAN 1201 to the eHRPD base station 1209 of the eHRPD network 1202 prior to what is depicted in FIG. 12.

Figure 13:
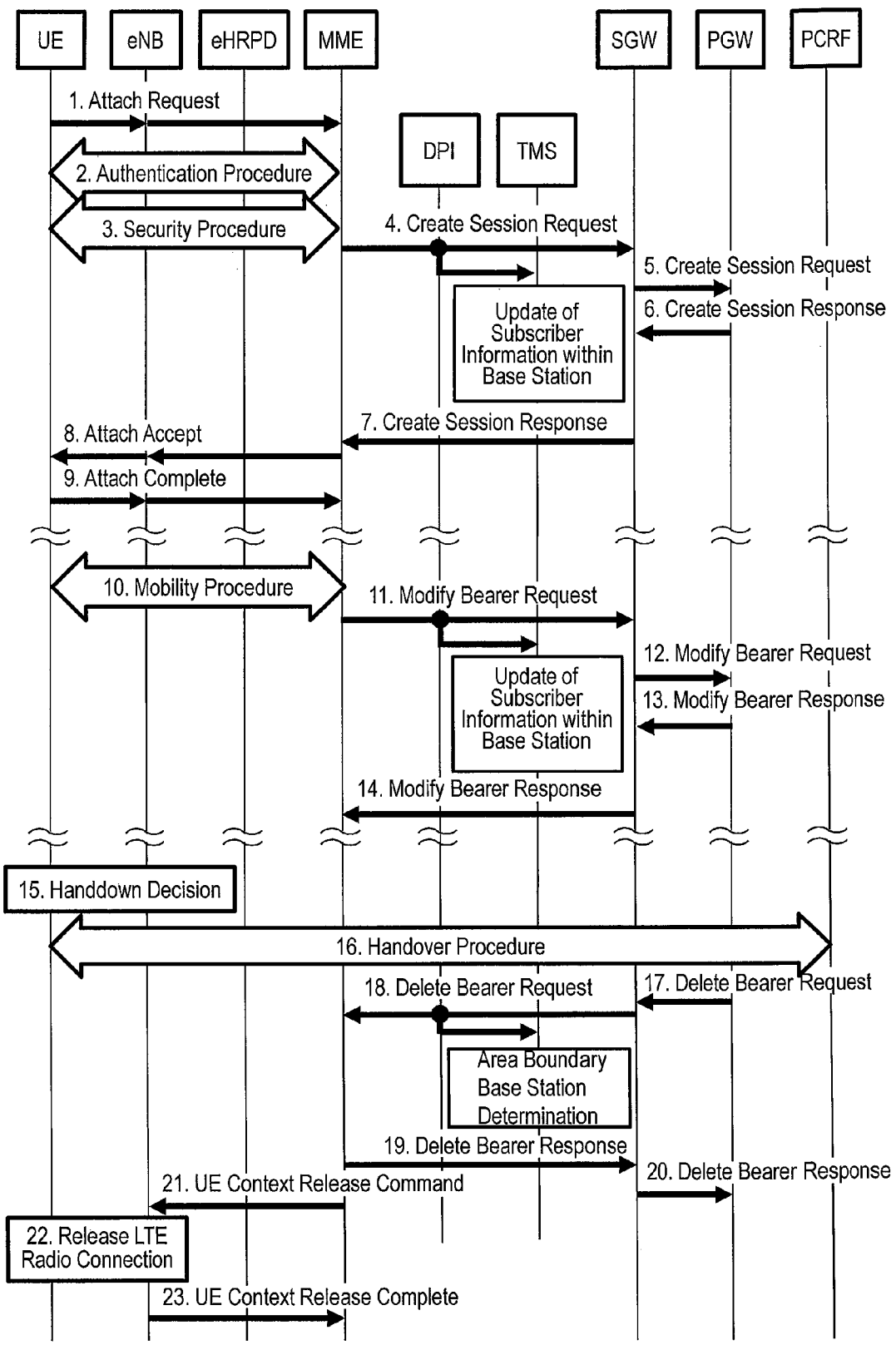
FIG. 13 illustrates an example of a sequence of messages between the elements of a mobile network when the TMS makes a determination as to which base station among those arranged in the mobile network is the area boundary base station.

FIG. 13 illustrates an example of a sequence of messages between the elements of a mobile network when the TMS according to the present embodiment makes a determination as to which base station among those arranged in the mobile network is the area boundary base station.

(Newly Connecting) When an Attach Procedure begins as a subscriber's mobile telephone terminal (UE in FIG. 13) transmits an Attach Request to the LTE base station of the E-UTRAN, the subscriber's mobile telephone terminal and the MME execute, while going through the LTE base station (eNB in FIG. 13), an Authentication Procedure and a Security Procedure. Then, the MME transmits a Create Session Request message to the S-GW. The DPI duplicates the above stated Create Session Request message, and transmits the same to the TMS. Then, the TMS extracts, upon receiving the above stated Create Session Request message, the IMSI, ECGI, TEID included in the Create Session Request message, executes, based on the extracted IMSI, ECGI, TEID, an update process of subscriber information within base station, and manages as to under which LTE base station's coverage the subscriber's mobile telephone terminal connected to the E-UTRAN is located.

(LTE-LTE Handover) When a handover occurs between LTE base stations in the E-UTRAN to a subscriber's mobile telephone terminal, the subscriber's mobile telephone terminal and the MME execute a Mobility Procedure. Then, the MME transmits a Modify Bearer Request message to the S-GW. The DPI duplicates the above stated Modify Bearer Request message, and transmits the same to the TMS. Then, the TMS extracts, upon receiving the above stated Modify Bearer Request message, the TEID and ECGI included in the Modify Bearer Request message, executes the update process of the subscriber information within base station, and manages as to under which LTE base station's coverage the subscriber's mobile telephone terminal moved within the E-UTRAN is located.

(LTE-eHRPD Handover) When a handover occurs from an LTE base station in the E-UTRAN to an eHRPD base station in the eHRPD network to a subscriber's mobile telephone terminal, the SGW, following the execution of a Handover Procedure, transmits a Delete Bearer Request message to the MME. The DPI duplicates the above stated Delete Bearer Request message, and transmits the same to the TMS. Then, the TMS executes, upon receiving the above stated Delete Bearer Request message, the area boundary base station determination process based on the detail of the Delete Bearer Request message and the subscriber information within area boundary base station, and updates the area boundary base station information. By this, it becomes possible to manage as to which base station of the mobile network base stations is the area boundary base station.

Note that in the present embodiment, an example in which the MME transmits the Modify Bearer Request message to the SGW because the handover occurred between LTE base stations to the subscriber's mobile telephone terminal while the mobile telephone terminal was in an active state. However, there are occasions where the subscriber's mobile telephone terminal moves to another base station's coverage while the mobile phone terminal is in an idle state. In such case, the Mobility Procedure is executed while in the idle state, and the MME transmits the Modify Bearer Request message to the SGW. Accordingly, it is possible for the TMS to obtain from the Modify Bearer Request message the ECGI of the base station at the movement destination and update the subscriber information within area boundary base station following the same procedure as that for the handover while the mobile phone terminal is in an active state.

Further, since the MME transmits the Modify Bearer Request message to the S-GW when the subscriber's mobile telephone terminal executes the Track Area Update Procedure, it is possible for the TMS to obtain from the Modify Bearer Request message the ECGI of the base station at the movement destination and update the subscriber information within area boundary base station following the same procedure as that for the handover while the mobile phone terminal is in ah active state.

Figure 14:
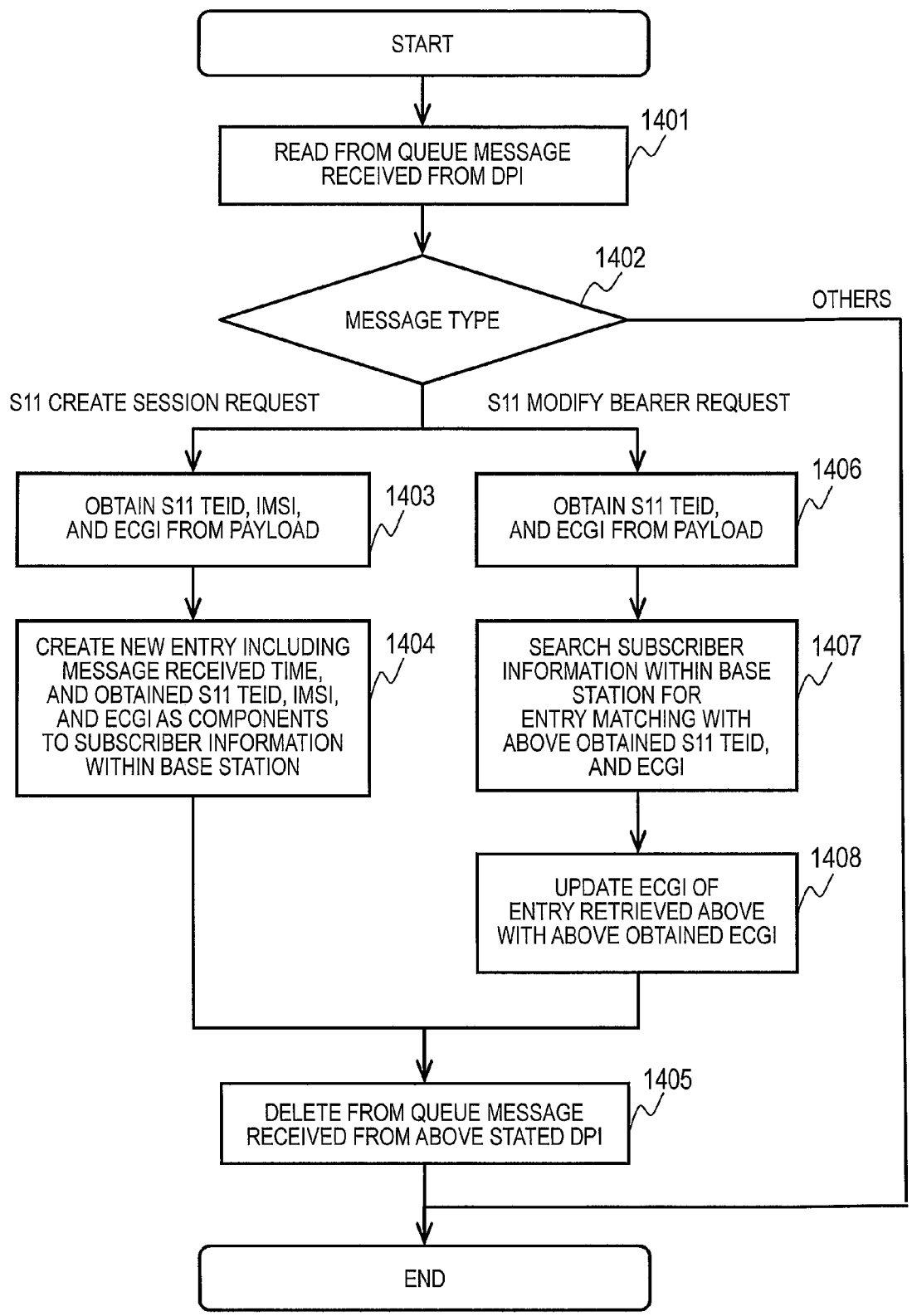
FIG. 14 illustrates an example of a processing flow of update process of the subscriber information within base station executed by the TMS.

FIG. 14 illustrates an example of a processing flow of the update process of the subscriber information within base station executed by the TMS according to the present embodiment. When starting this processing flow the TMS reads from the message queue which is designed to retain messages received from the DPI an oldest unprocessed received message (1401). Then, the TMS determines the message type of the received message (1402), and obtains, when the message is the S11 Create Session Request message, the S11 TEID, the IMSI, and the ECGI from the payload of the received message (1403). Then, the TMS newly creates an entry which includes a message reception time and S11 TEID, the IMSI, and the ECGI to the subscriber information within area boundary base station (FIG. 8) (1404). Then, finally, the TMS deletes from the message queue the received message, and ends the processing flow (1405). By these processes, the subscriber's mobile telephone terminal that is newly connected to the LTE base station in the E-UTRAN is added to the management of the TMS.

On the other hand, when the message type of the received message from the DPI is the S11 Modify Bearer Request, the TMS first obtains the S11 TEID and ECGI from the payload of the received message (1406). Then, the TMS searches the base station coverage information for an entry which retains the TEID matching with the obtained S11 TEID stated above (1407). Then, the TMS replaces the ECGI obtained from the payload of the above stated received message with the ECGI of the entry retrieved (1408). Then, finally, the TMS deletes the received message from the message queue, and ends the processing flow (1405).

Figure 15:
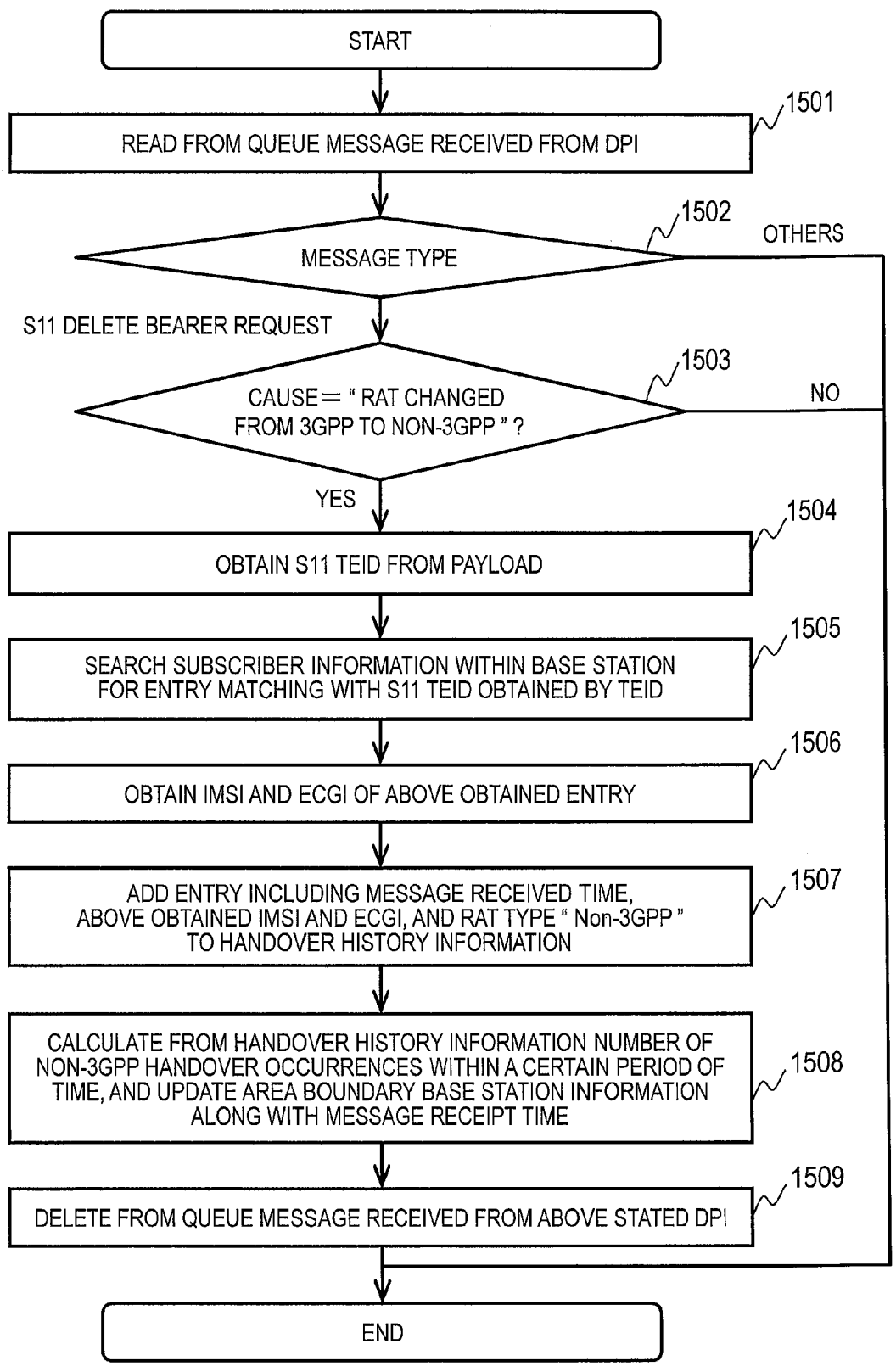
FIG. 15 illustrates an example of a processing flow of the area boundary base station determination process executed by the TMS.

FIG. 15 illustrates an example of a processing flow of the area boundary base station determination process executed by the TMS according to the present embodiment. When starting this processing flow the TMS reads from the message queue which is designed to retain messages received from the DPI an oldest unprocessed received message (1501). Then, the TMS determines the message type of the received message (1502). When the message type is the S11 Delete Bearer Request message, the TMS inspects to find out whether the value of the cause information element included in the message is equivalent to "RAT changed from 3GPP to Non-3GPP" (1503), and when the value of the cause information element and the "RAT changed from 3GPP to Non-3GPP" are equivalent to one another, the TMS obtains the TEID from the payload of the received message (1504). Then, the TMS searches the subscriber information within area boundary base station for an entry which retains the TEID matching with the obtained TEID stated above (1505). Then, the TMS obtains the IMSI and the ECGI from the retrieved entry (1506). Then, the TMS newly creates an entry which includes a combination of a message reception time of the above stated Delete Bearer Request message, and the above obtained IMSI, the above obtained ECGI and the value of the RAT type, and adds the entry to the handover history information (FIG. 6) (1507). Then, the TMS extracts from the above stated handover history information the ECGI of the base station whose entry exists in the handover history information within a period between the above stated message reception time and a predetermined period of time therebefore. Then, the TMS calculates the number of occurrences of handovers within the above stated period for each base station using the number of corresponding entries of the handover history information, and adds to the area boundary base station information (FIG. 7) an entry including the combinations of time in which the present sequence is executed, the above stated ECGI, and the number of occurrences of handovers. Also at the time same, the TMS deletes from the area boundary base station information the entry whose entry registration time is earlier than the above stated time period prior to the time in which the present sequence is executed (1508). Then, finally, the TMS deletes the above stated received message from the above stated message queue (1509), and ends the processing flow. In this manner, the base station whose entry exists in the handover history information within a predetermined period of time is registered as the area boundary base station. By these processes, it becomes possible to identify the LTE base station at which handovers to the eHRPD base stations occur at a high frequency as the area boundary base station, and update the same accordingly.

Further, when registering the area boundary base station to the above stated area boundary base station information, it is possible to register, in addition to the number of occurrences of handovers to the eHRPD base stations, the ratio of the number of occurrences of handovers to the eHRPD base stations out of the number of occurrences of handovers including those to the LTE base stations. Further, when the TMS executes the processing flow of the subscriber information within area boundary base station, which will be described below, it is possible to determine that the subscriber's mobile telephone terminal is subject to a bandwidth limitation control with respect to the entry of the area boundary base station having a value of the ratio of the number of occurrences of handovers higher than that designated in advance by the administrator of the mobile business operator. By this, it becomes possible for the mobile business operator to make adjustments such that the area boundary base station having a relatively and distinctively smaller number of handover occurrences from the LTE base station to the eHRPD base station compared with the handover occurrences from the LTE base station to another LTE base station is removed from the subject of the bandwidth control process applied to the subscriber's mobile telephone terminal.

On the other hand, when the message type of the received message is other than the S11 Delete Bearer Request message, or when the value of the cause information element of the received S11 Delete Bearer Request message is other than "RAT changed from 3GPP to Non-3GPP," the TMS ends the present processing.

As described above, the TMS according to the present embodiment is operable to update the area boundary base station information in an automatic manner by executing the area boundary base station determination process flow. By virtue of such configuration, it is advantageous, with respect to the changes of the operation characteristics of the LTE base stations accompanying the increase or decrease of the number of the LTE base stations or the change in parameter settings, in that the mobile business operator will not be required to execute operational procedures such as setting parameters of the TMS according to the present embodiment.

Note that according to the example of the present embodiment the area boundary base station information is updated in an automatic manner by the TMS executing the area boundary base station determination process flow illustrated in FIG. 15. However, it is also possible to set and update the area boundary base station by the TMS based on the information inputted by the administrator of the mobile business operator specifying the area boundary base station. For example, the administrator of the mobile business operator may, in accordance with the timing at which the changes are made to the operation characteristics of the LTE base station, manually update the area boundary base station information so as to change the LTE base station subject to the bandwidth limitation by the TMS.

Figure 16:
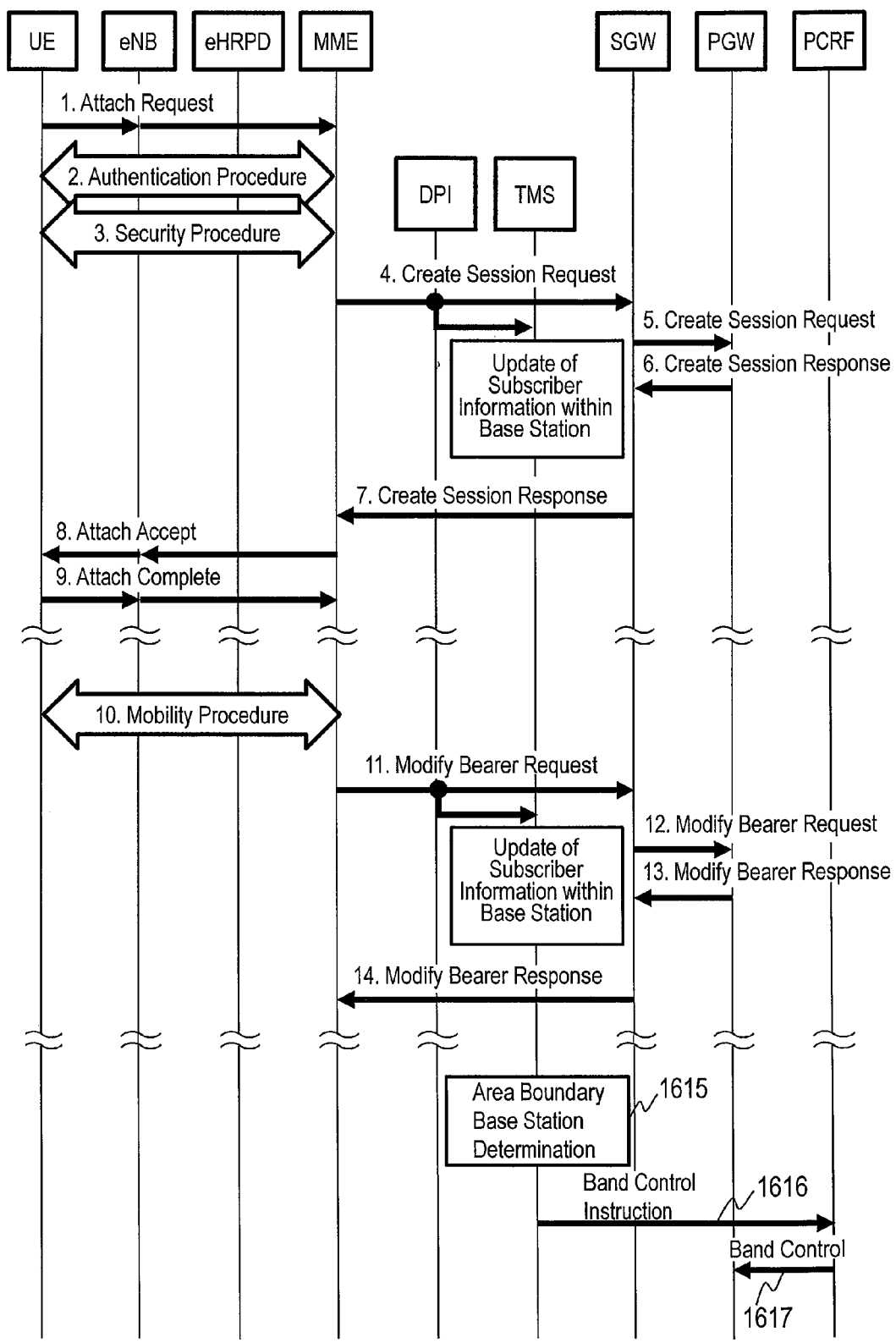
FIG. 16 illustrates an example of a sequence of messages between the elements of a mobile network when the TMS determines a user located within the coverage of the area boundary base station.

FIG. 16 illustrates an example of a sequence of messages between the elements of a mobile network when the TMS according to the present embodiment determines a user located within the coverage of the area boundary base station.

(Newly Connecting) A sequence 1 to a sequence 9 in FIG. 16 illustrate the message sequence that takes place when a subscriber's mobile telephone terminal (UE in FIG. 16) is being connected to the LTE base station of the E-UTRAN. The message sequence of the sequence 1 to the sequence 9 illustrated in FIG. 16 is same as the message sequence illustrated in FIG. 13. Also, since the processing flow of the update process of the subscriber information within base station executed by the TMS is the same as the processing flow illustrated in FIG. 14, the description thereof will be omitted.

(LTE-LTE Handover) A sequence 10 to a sequence 14 in FIG. 16 illustrate the message sequence that takes place when a handover occurs between LTE base stations in the E-UTRAN to a subscriber's mobile telephone terminal. The sequence 10 to the sequence 14 in FIG. 16 are the same as the same as the sequence 10 to the sequence 14 in FIG. 14. Also, since the processing flow of the update process of the subscriber information within base station executed by the TMS is the same as the processing flow illustrated in FIG. 14, the description thereof will be omitted.

After the sequence 1 to the sequence 14 have been executed, the subscriber information within area boundary base station will include the entry corresponding to the subscribers' mobile telephone terminals 1204 to 1206 located within the coverage of the E-UTRAN base station recorded therein.

(Determining area boundary base station coverage) The TMS executes the area boundary base station coverage determination process at a predetermined interval or each time the subscriber information within area boundary base station is updated. Then, out of the subscribers' mobile telephone terminals whose coverage status is recorded in the subscriber information within area boundary base station, the TMS creates a list of subscribers' mobile telephone terminals that are located within the coverage of the area boundary base station, and updates the bandwidth limited subscriber information (FIG. 10) (1615). Then, the TMS transmits to a PCRF the above stated list of subscribers' mobile telephone terminals that are located within the coverage of the area boundary base station, and gives an instruction to the PCRF to limit the usable bandwidth of the subscribers' mobile telephone terminals included in the list (1616). The PGW receives the instruction from the PCRF, and limits the usable bandwidth of the corresponding traffic flow in accordance with the instruction contents (1617). Note that the PCRF (policy and charging rules function), which is connected with the PGW, provides policy control such as QoS and is designed to determine charging control rules. FIG. 1 omits the depiction of the PCRF as well as a PCEF included in the PGW. Also note that since the instruction to execute the bandwidth control to the PCRF and the PCRF is a well-known technology in the mobile network, the description thereof will be omitted.

Figure 17:
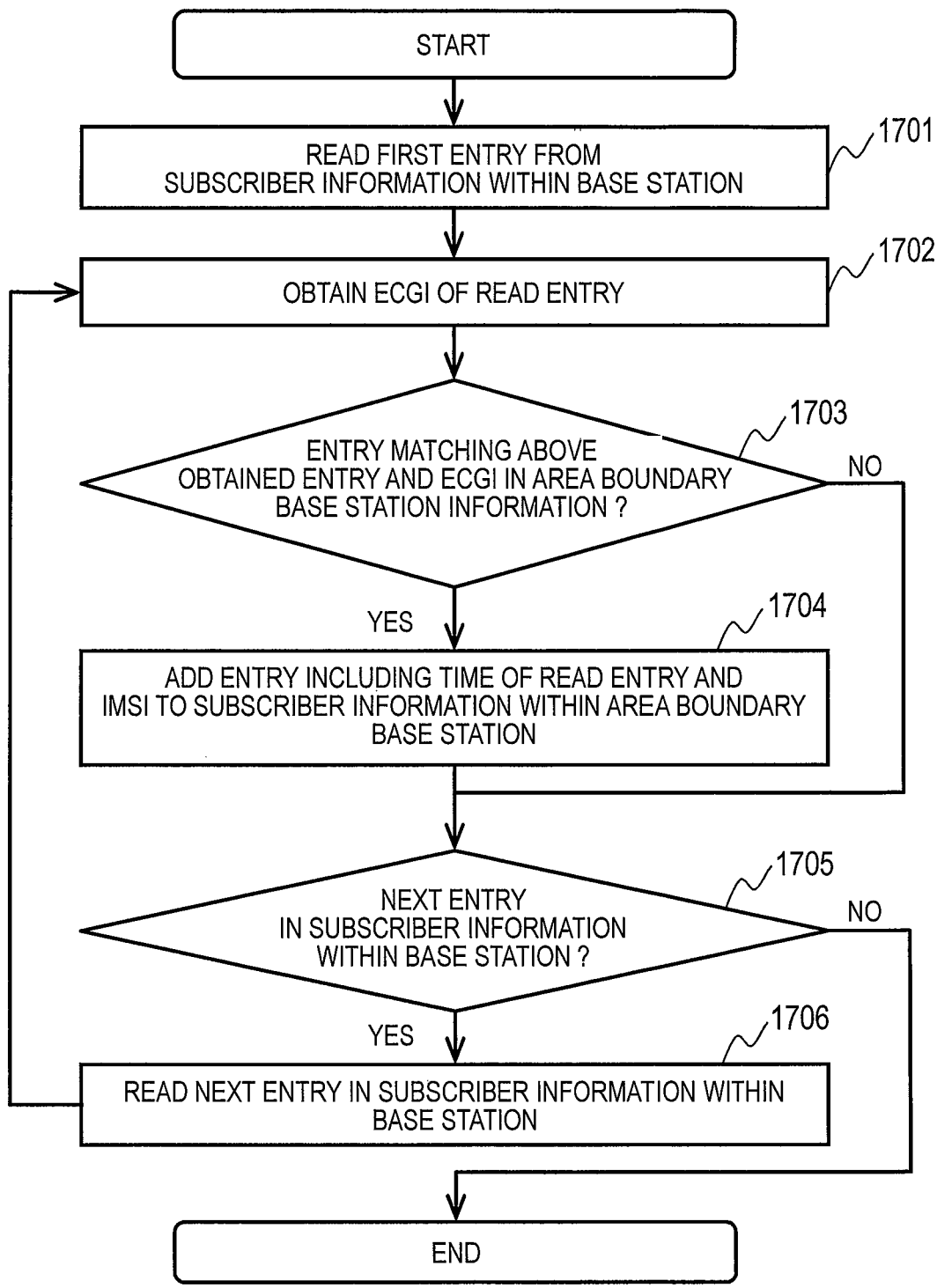
FIG. 17 illustrates an example of a processing flow of a detection process of subscriber within area boundary base station executed by the TMS.

FIG. 17 illustrates an example of a processing flow of a detection process of subscriber within area boundary base station executed by the TMS according to the present embodiment. When starting this processing flow the TMS reads a first entry of the subscriber information within area boundary base station (1701), and obtains the ECGI of the entry (1702). Then, the TMS makes a determination as to whether the area boundary base station information includes an entry having the ECGI matching with the above obtained ECGI (1703). When such entry is included, that is, when it is determined that a subscriber's mobile telephone terminal corresponding to the entry retrieved above is located within the coverage of the area boundary base station, the TMS adds an entry including time and IMSI to the subscriber information within area boundary base station (FIG. 9) (1704). On the other hand, when it is determined that the area boundary base station coverage does not include the entry having an ECGI matching with the above obtained ECGI, the TMS proceeds to the next process without adding a new entry to the subscriber information within area boundary base station. Then, the TMS makes a determination as to whether the subscriber information within area boundary base station includes the next entry (1705), and reads the next entry when such entry is included (1706), and returns to the second sequence of the present processing flow (1702) so as to repeat the same process. When the subscriber information within area boundary base station does not include the next entry, that is, when determinations have been made to all the subscribers' mobile telephone terminals located within the coverage of base station, the TMS ends the present processing flow. Note, an inquiry may be made at 1703 as to whether or not an entry, which includes a value of a ratio of the number of handover occurrences to the eHRPD base station with respect to the number of handover occurrences higher than a predetermined value, is included in the area boundary base station information. By this, it becomes possible to extract a subscriber located within the coverage of the area boundary base station and for whom handovers to the eHRPD base station occur at a higher frequency.

Figure 18:
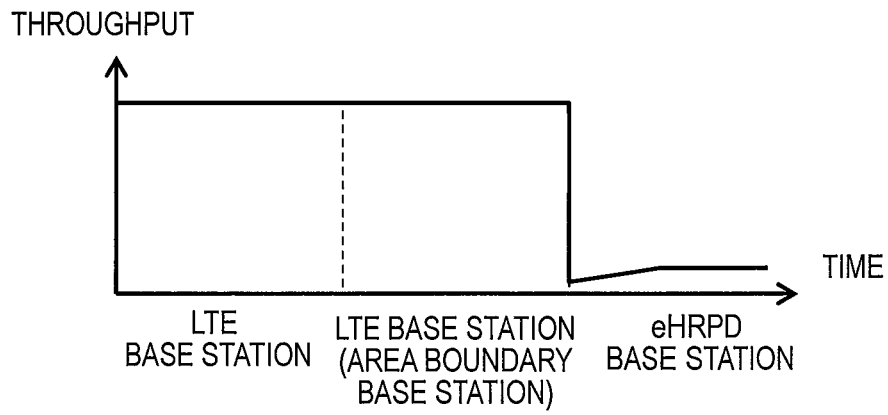
FIG. 18 illustrates an example of a change in the throughput of a subscriber's mobile telephone terminal between before the application of an embodiment.
Figure 19:
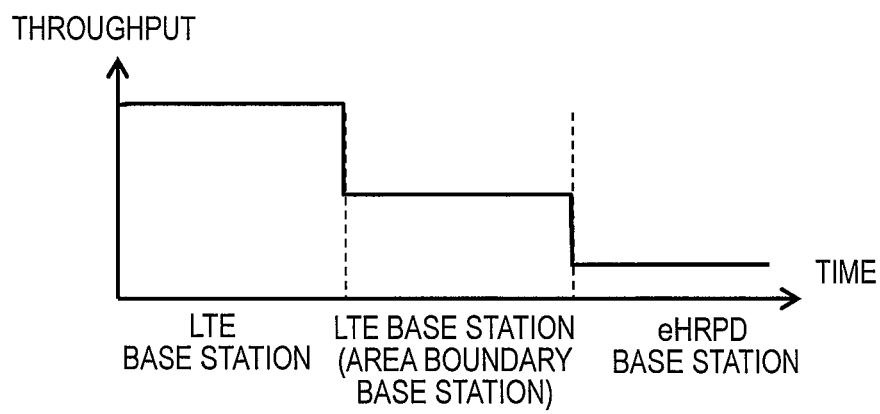
FIG. 19 illustrates an example of a change in the throughput of a subscriber's mobile telephone terminal between after the application of the embodiment.

FIGS. 18 and 19 illustrate an example of a change in the throughput of a subscriber's mobile telephone terminal between before and after the application of the present embodiment thereto. As illustrated in FIG. 18, before the application of the present embodiment, when a handover occurs to a subscriber's mobile telephone terminal from the LTE base station 1203, which is the area boundary base station, to the eHRPD base station 1209, due to the difference in the maximum communication speed of the two base stations, a great deal of packet losses occur which results in the lowered quality of packet data communication experienced by the subscriber.

On the other hand, as illustrated in FIG. 19, after the application of the present embodiment, when a handover occurs to a subscriber's mobile telephone terminal from the LTE base station 1203, which is the area boundary base station, to the eHRPD base station 1209, since the maximum communication speed of a subscriber's mobile telephone terminal is limited by the area boundary base station, the difference in the maximum communication speed between the LTE base station 1203, which is the area boundary base station, and the eHRPD base station 1209.

Accordingly, by the application of the present embodiment, the mobile business operator becomes able to improve, when compared with non-application of the present embodiment, the quality of packet data communication experienced by subscribers.

Note, when giving limitations to the usable bandwidth to the terminals located within the coverage of the area boundary base station, the degree of such limitation may be set in an arbitrary manner. For example, the maximum usable communication bandwidth may include an intermediate value between the maximum usable communication bandwidth of the LTE base station and the maximum usable communication bandwidth of the eHRPD base station.

Further, while FIG. 19 shows an example in which the usable bandwidth is limited in one occasion, the limitation can be assigned in multiple stages.

In the present embodiment an example is provided in which the TMS incorporates the LTE base station in the list as the area boundary base station with respect to the combination of the two base stations, where handovers occur from the LTE base station to the eHRPD base station.

In the meantime, there are LTE base stations that constantly provide low throughput for subscribers' mobile telephone terminals compared with other LTE base stations. For example, there are occasions in which the LTE base station is arranged at the top of a mountain creating, relatively speaking, a large distance between the base station and a subscriber's mobile telephone terminal. Also, there are occasions in which the number of subscribers' mobile telephone terminals located within the coverage of a particular LTE base station is constantly greater than that compared with another LTE base station, thereby creating a constant congestion. Also, there may be occasions in which an LTE base station having multiple carrier elements is arranged adjacent to another LTE base station which does not have multiple carrier elements.

Accordingly, when a handover to an LTE base station constantly having a lower throughput occurs to a subscriber's mobile telephone terminal, a great deal of packet losses occurs to the subscriber's mobile telephone terminal which creates a problem where the subscriber experiences lowered quality of packet data communication.

Accordingly, it becomes possible to implement the present embodiment as the TMS continuously measures and retains, instead of the handover history information, the average throughput of subscribers for each LTE base station and further retains the information concerning the arrangement of the base stations so as to determine the area boundary base station by extracting the LTE base station arranged adjacent to the LTE base station having a low average subscriber throughput in accordance with the area boundary base station coverage subscriber detection process illustrated in FIG. 17.

Embodiment 2

According to embodiment 2, an embodiment of the traffic management server designed to manage the handover from a 3GPP E-UTRAN wireless access network to a 3GPP UTRAN wireless access network occurring to a subscriber's mobile telephone will be described.

Figure 20:
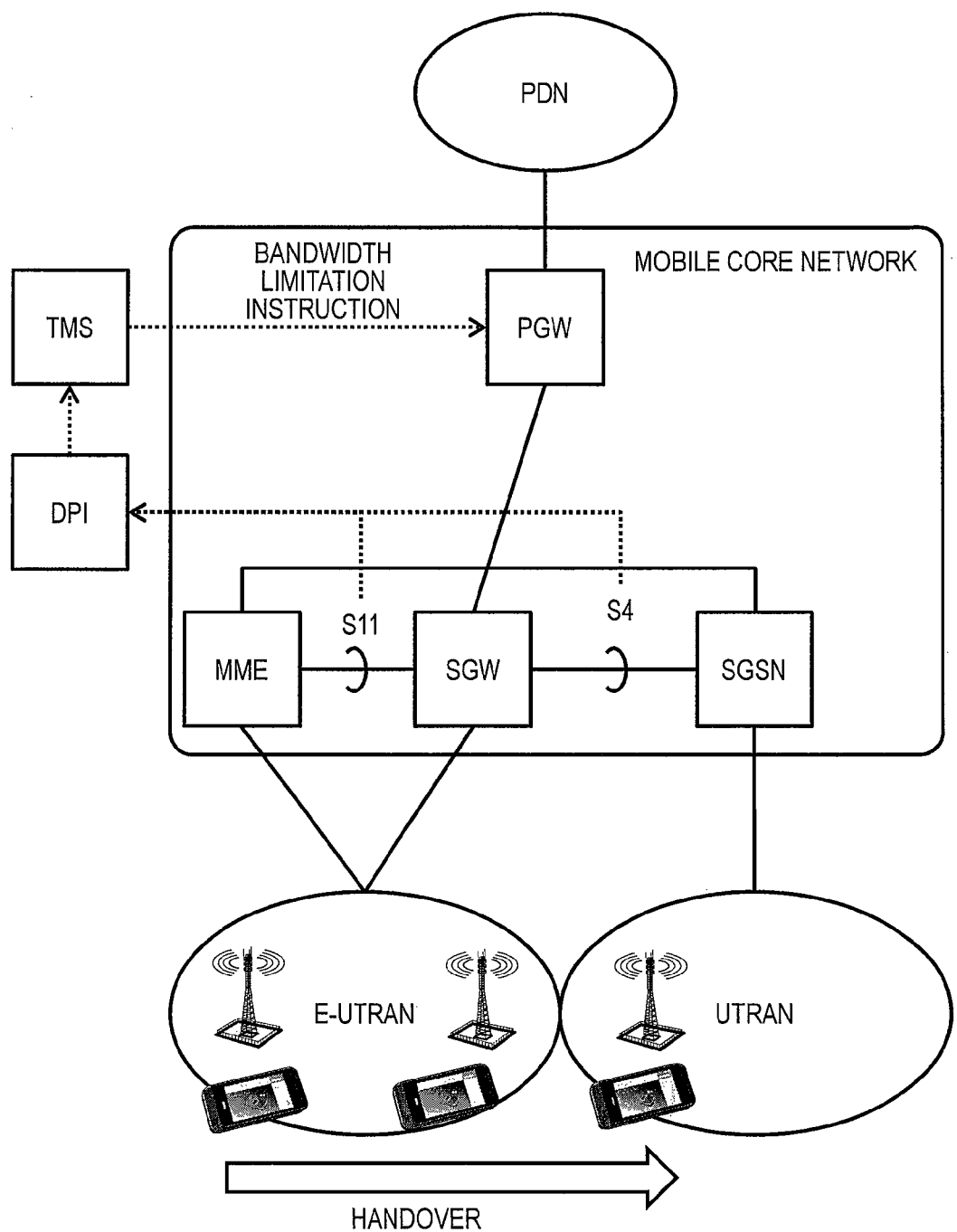
FIG. 20 illustrates an example of a configuration of an entire network system.

FIG. 20 illustrates an example of a configuration of an entire network system according to the present embodiment. The present system includes the traffic management server (hereinafter, TMS), the packet detailed analysis apparatus (hereinafter, DPI), the mobile core network, the E-UTRAN wireless access network designed to accommodate therein a mobile telephone terminal (hereinafter, E-UTRAN), the UTRAN wireless access network designed to accommodate therein a mobile telephone terminal (hereinafter, UTRAN), and the packet data network (hereinafter, PDN). Further, the mobile core network includes the MME (Mobility Management Entity), the SGW (Serving Gateway), the PGW (Packet data network Gateway), and the SGSN (Serving GPRS Support Node). Since the MME, the SGW, and the PGW according to the present embodiment are the same as those in embodiment, the description thereof will be omitted. The SGSN, like the MME, is designed to execute mobile management and authentication (security control) of the terminals at the 3G wireless access network. Further, SGSN is designed to provide a feature allowing a connection from the SGSN to the SGW when setting up a communication path for a LTE/3G dual terminal in order to maintain communications during a switch between the wireless connections of LTE and 3G.

The above stated DPI is designed to monitor the S11 I/F connecting the above stated MME with the above stated SGW, and an S4 I/F connecting the above stated MME with the above stated SGSN. Further, the DPI forwards a control message obtained from the above stated I/F to the TMS.

Further, the above stated TMS determines, based on the control message received from the DPI, the mobile telephone terminals located within a coverage of the base station to which a handover from the E-UTRAN to the UTRAN is occurring, and sends an instruction to the PGW so as to limit the usable bandwidth for each of the mobile telephone terminals.

Figures 21, 22:
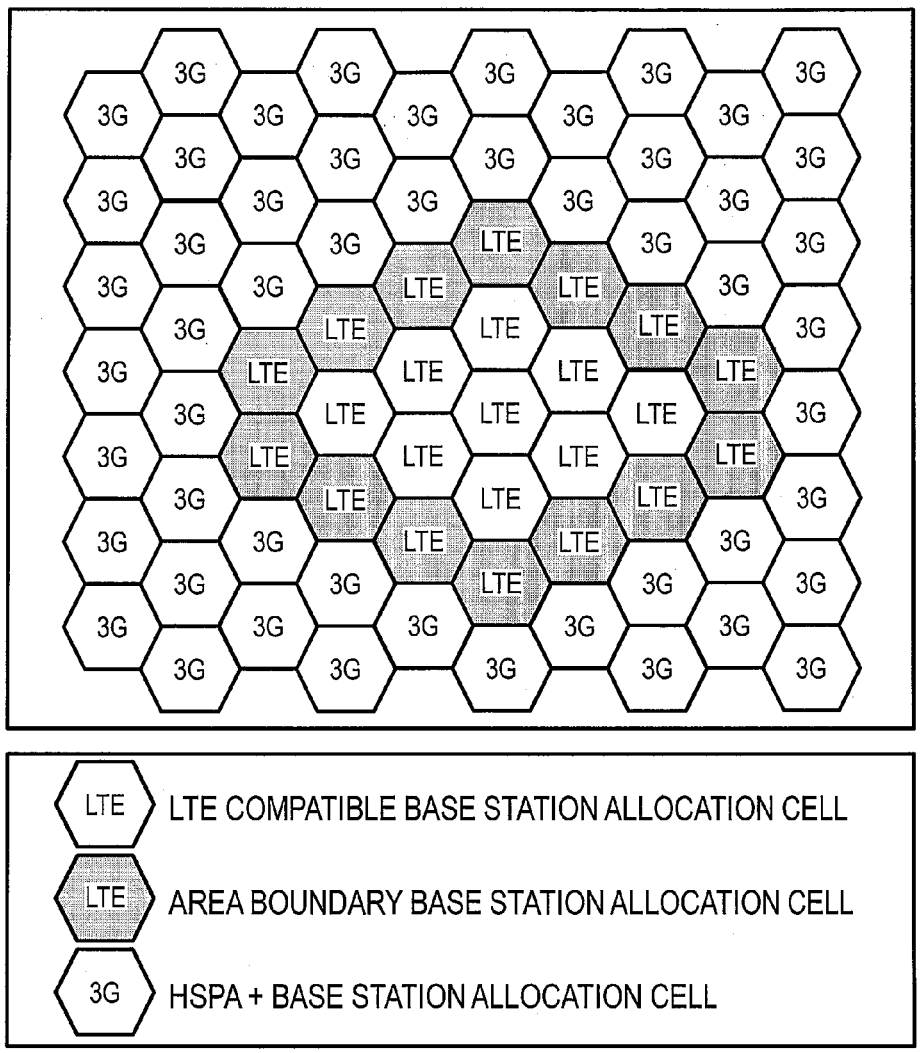
FIG. 21 illustrates an example of a configuration of base station allocation of the mobile business operator.
FIG. 22 illustrates an example of a configuration of the handover history information of the TMS.

FIG. 21 illustrates an example of a configuration of base station allocation of the mobile business operator according to the present embodiment. This example depicts the cells (hereinafter, LTE cell) showing the allocation of LTE compatible base station at the center thereof with the cells (hereinafter, 3G cells) showing the allocation of HSPA+ base stations surrounding the outside of the LTE cells. Here, the LTE cells that adjoin the above stated 3G cells are defined and depicted as area boundary base station allocation cells (hereinafter, area boundary cells). Generally speaking, handovers from the LTE base station to the HSPA+ base station are more likely to occur to the subscribers' mobile telephone terminals at the base station (hereinafter, area boundary base station) corresponding to the area boundary base station allocation cells because of their adjoining location with the 3G cells.

FIG. 22 illustrates an example of a configuration of the handover history information of the TMS according to the present embodiment. The TMS uses this information in order to manage as to at which base station out of the base stations of the mobile business operator a handover occurred to a subscriber's mobile telephone terminal. Each entry of this information includes a combination of time in which the entry is newly created or time in which the TMS detects a handover occurred to the subscriber's mobile phone terminal, an identifier of the subscriber's mobile phone terminal (IMSI), an identifier of an original base station of the subscriber's mobile telephone terminal prior to the motion thereof (ECGI), and a type of a wireless access technology (RAT: Radio Access Technology) of a base station at the destination of the motion of the subscriber's mobile phone terminal.

The present example according to the present embodiment includes "UTRAN" for the wireless access technology for the destination base station for each entry, and the handovers take place to 3 units of subscribers' mobile telephone terminals from the LTE cell to the 3G cell after the TMS starts monitoring the 3 units.

Figure 23:
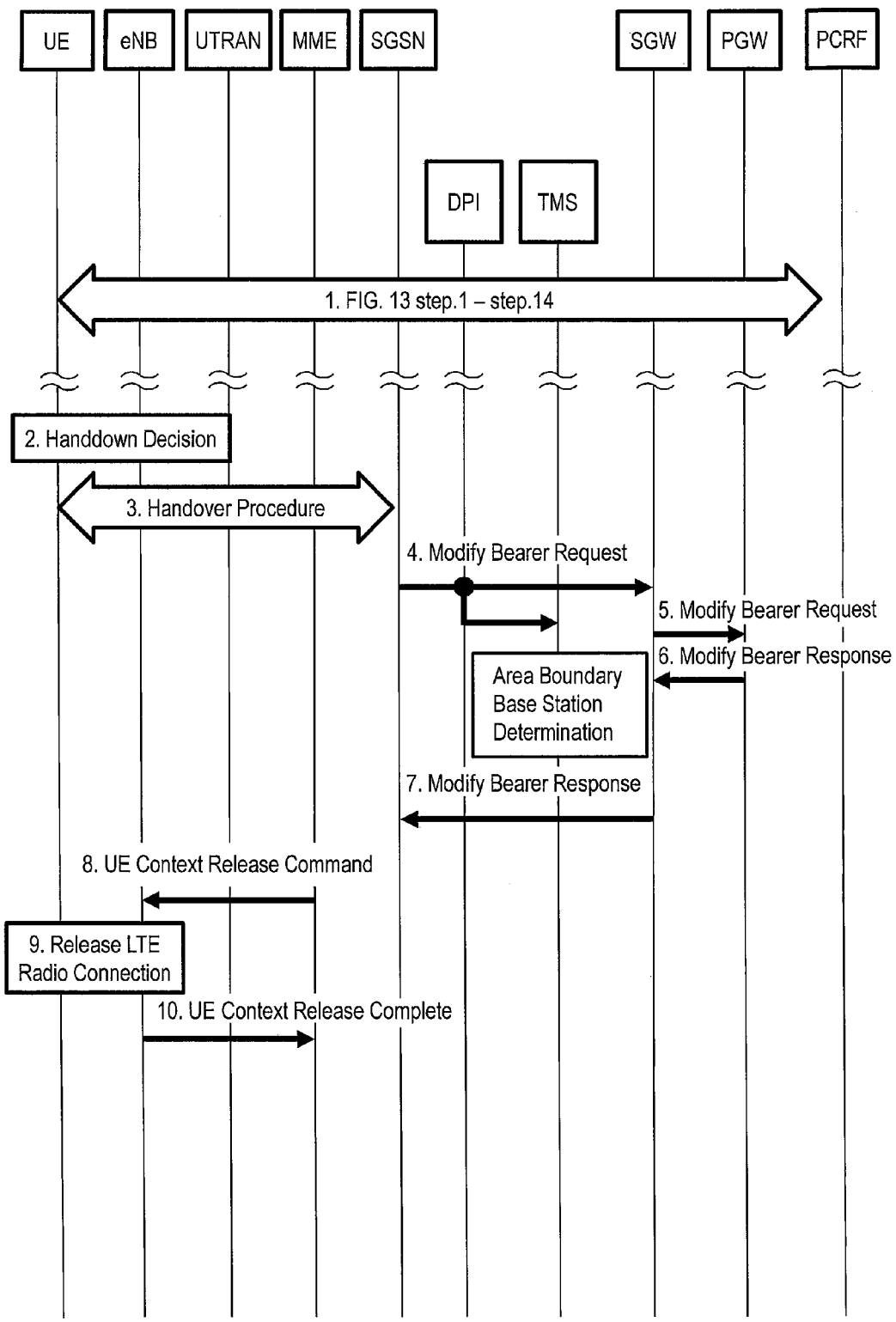
FIG. 23 illustrates an example of a sequence of messages between the elements of a mobile network when the TMS determines which base station among those arranged in the mobile network is the area boundary base station.

FIG. 23 illustrates an example of a sequence of messages between the elements of a mobile network when the TMS according to the present embodiment determines which base station among those arranged in the mobile network is the area boundary base station.

Of the message sequences according to the present embodiment, Step 1 in which the subscriber information within area boundary base station which is designed to manage the information concerning the coverage of a subscriber's mobile telephone terminal connected to the LTE base station is created as well as the subscriber information within area boundary base station is updated when a handover to new LTE base station is occurred to the subscriber's mobile telephone terminal is the same as Step 1 through Step 14 illustrated in FIG. 13 according to the previously described embodiment 1. Therefore, the description thereof will be omitted.

After the TMS updates the subscriber information within area boundary base station at the above stated Step 1, when a handover from the LTE base station to the eHRPD base station occurs to a subscriber's mobile telephone terminal, the SGSN, following the execution of the Handover Procedure, transmits the Modify Bearer Request message to the SGW. The DPI duplicates the above stated Modify Bearer Request message, and transmits the same to the TMS. Then, the TMS executes, upon receiving the above stated Modify Bearer Request message, the area boundary base station determination process based on the detail of the Modify Bearer Request message and the subscriber information within area boundary base station, and updates the area boundary base station information. By this, it becomes possible to manage as to which base station of the mobile network base stations is the area boundary base station.

Figure 24:
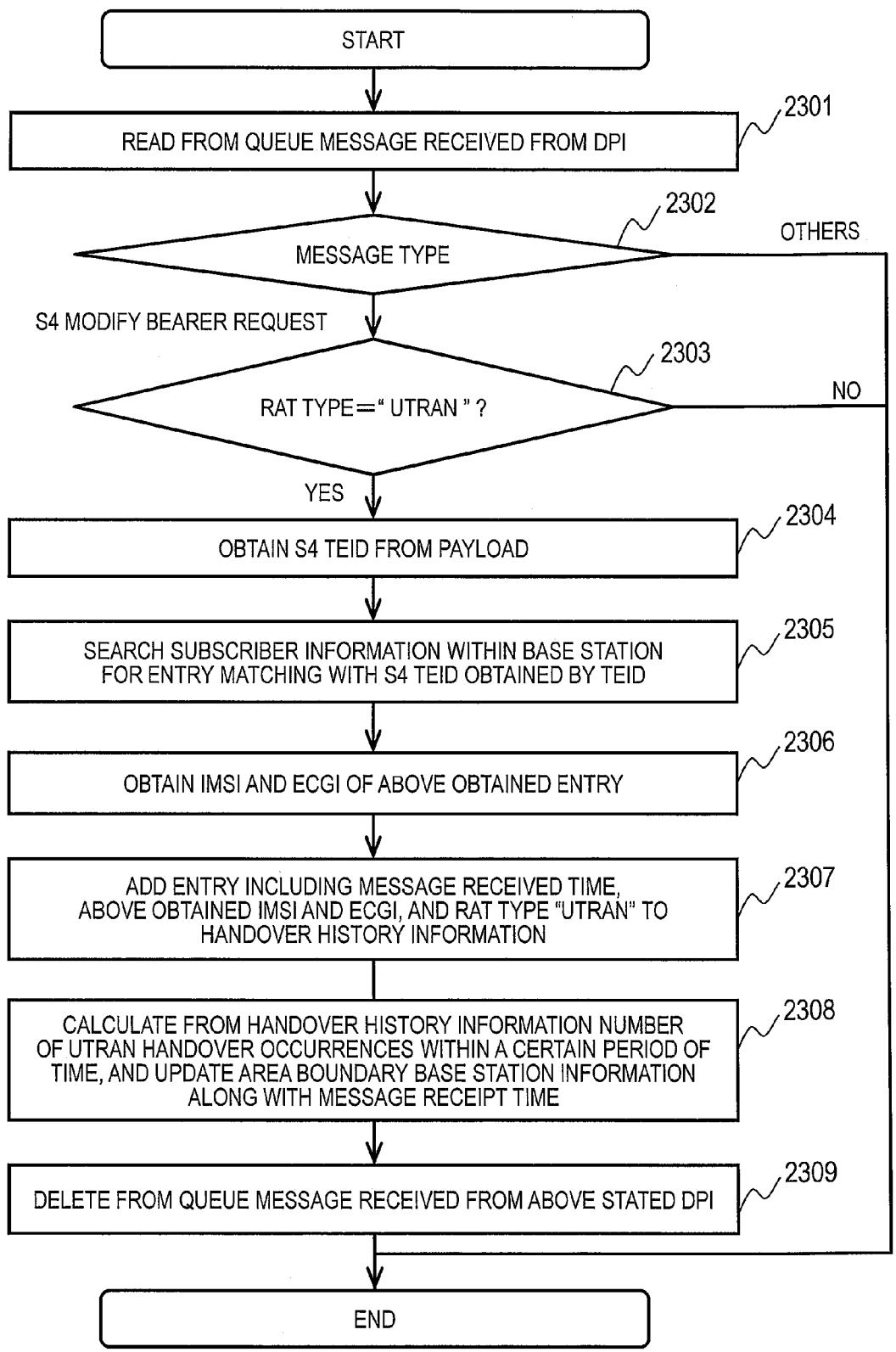
FIG. 24 illustrates an example of the processing flow of update of the subscriber information within base station.

FIG. 24 illustrates an example of the processing flow of update of the subscriber information within base station. When starting this processing flow, the TMS reads from the message which is designed to retain messages received from the DPI an oldest unprocessed received message (2301). Then, the TMS determines the message type of the received message (2302), and, when the message is the S4 Modify Bearer Request message, inspects to find out whether the value of the RAT Type information elements included in the received S4 Modify Bearer Request message is "UTRAN" (2303). When the value of the RAT Type information elements is "UTRAN," the TMS obtains from the payload of the received message the S4 TEID (2304). Then, the TMS searches the subscriber information within area boundary base station for an entry having the TEID matching with the S4 TEID obtained above (2305). Then, the TMS obtains the IMSI and the ECGI from the retrieved entry (2306). Then, the TMS adds an entry which includes a combination of a message reception time of the above stated S4 Modify Bearer Request message, the above obtained IMSI, the above obtained ECGI, and the value of the RAT Type to the handover history information (2307). Then, the TMS extracts from the above stated handover history information the ECGI of the base station whose entry exists in the handover history information within a period between the above stated message reception time and a predetermined period of time therebefore. Then, the TMS calculates the number of occurrences of handovers within the above stated period for each base station using the number of corresponding entries of the handover history information, and adds to the area boundary base station information an entry including the combinations of time in which the present sequence is executed, the above stated ECGI, and the number of occurrences of handovers. Also at the time same, the TMS deletes from the area boundary base station information the entry whose entry registration time is earlier than the above stated time period prior to the time in which the present sequence is executed (2308). Then, finally, the TMS deletes the above stated received message from the above stated message queue (2309), and ends the processing flow, and ends the processing flow.

On the other hand, when the message type of the received message is other than the S4 Modify Bearer Request message, or when the value of the RAT Type information element of the received S4 Modify Bearer Request message is other than "UTRAN," the TMS ends the present processing As described above, the TMS according to the present embodiment is operable to update the area boundary base station information in an automatic manner by executing the area boundary base station determination process flow. By virtue of such configuration, it is advantageous, with respect to the changes of the operation characteristics of the LTE base stations accompanying the increase or decrease of the number of the LTE base stations or the change in parameter settings, in that the mobile business operator will not be required to execute operational procedures such as setting parameters of the TMS according to the present embodiment.

Note, as for the TEID of a GTPv2 tunnel of the S11 I/F and S4 I/F, the same TEID is always allocated with respect to a specific IMSI. Accordingly, by searching for an entry having the matching TEID in the subscriber information within area boundary base station, it becomes possible to identify the subscriber's mobile telephone terminal that is subject to the above stated S4 Modify Bearer Request message.

Note that the processing flow in which the TMS gives an instruction to the PGW to limit the usable bandwidth to each of the mobile telephone terminals located within the coverage of the area boundary base station is the same as that described in embodiment 1, and therefore, the description thereof will be omitted.

Embodiment 3

According to embodiment 3, an embodiment of the traffic management server designed to manage the handover from a 3GPP E-UTRAN wireless access network to a 3GPP2 eHRPD system wireless access network or the 3GPP UTRAN wireless access network occurring to a subscriber's mobile telephone will be described.

Figure 25:
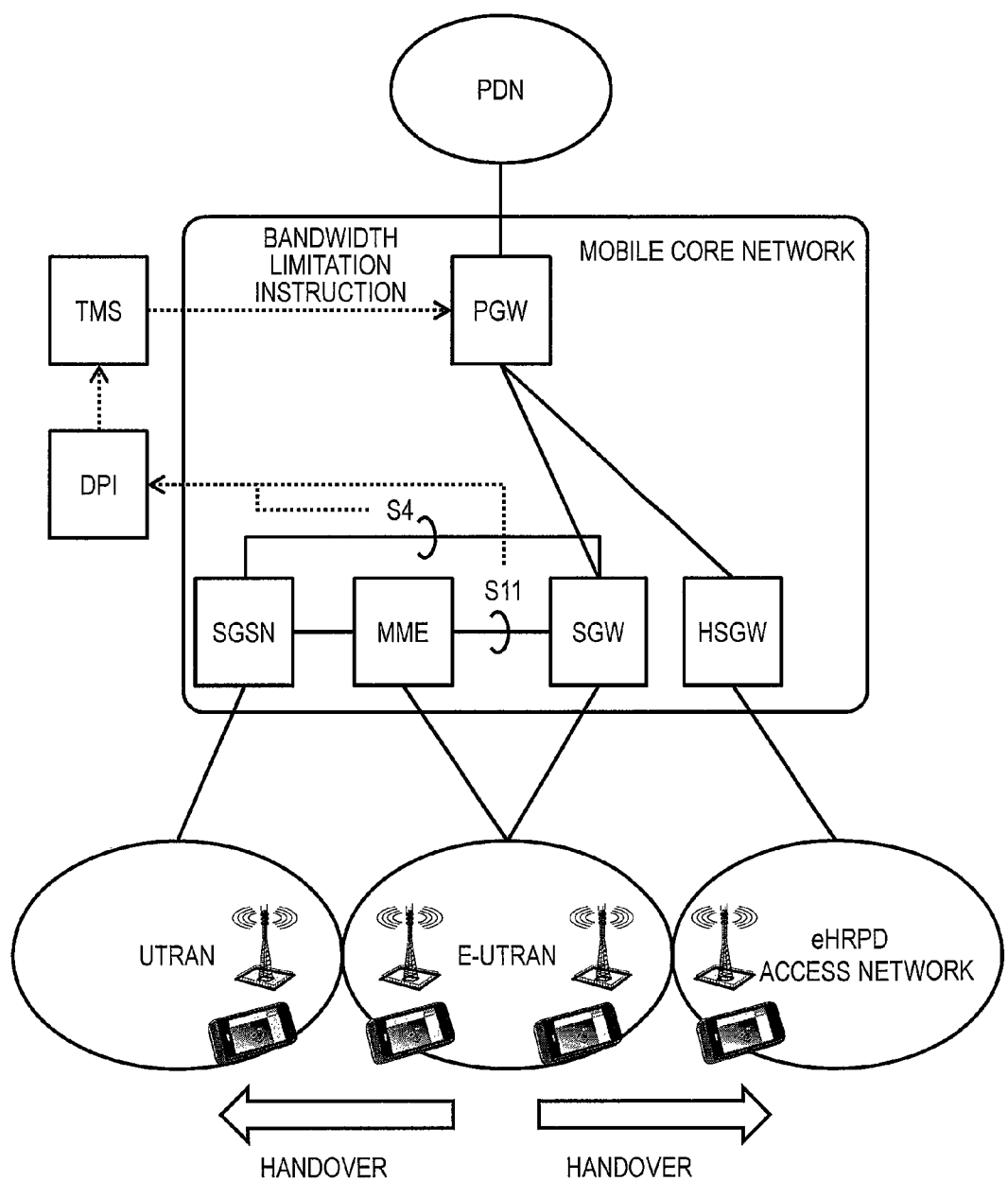
FIG. 25 illustrates an example of a configuration of an entire network system.

FIG. 25 illustrates an example of a configuration of an entire network system according to the present embodiment. The present system includes the traffic management server (hereinafter, TMS), the packet detailed analysis apparatus (hereinafter, DPI), the mobile core network, the E-UTRAN wireless access network designed to accommodate therein a mobile telephone terminal (hereinafter, E-UTRAN), the UTRAN wireless access network designed to accommodate therein a mobile telephone terminal (hereinafter, UTRAN), the eHRPD wireless access network designed to accommodate therein a mobile telephone terminal (hereinafter, eHRPD network), and the packet data network (hereinafter, PDN). Further, the mobile core network includes the MME (Mobility Management Entity), the SGW (Serving Gateway), the PGW (Packet data network Gateway), the SGSN (Serving GPRS Support Node), and the HSGW (HRPD Serving Gateway).

The above stated DPI is designed to monitor the S11 I/F connecting the above stated MME with the above stated SGW, and the S4 I/F connecting the above stated MME with the above stated SGSN. Further, the DPI forwards a control message obtained from the above stated I/F to the TMS.

Further, the above stated TMS determines, based on the control message received from the DPI, the mobile telephone terminals located within a coverage of the base station to which a handover from the E-UTRAN to the UTRAN or a handover from the E-UTRAN to the eHRPD network is occurring, and sends an instruction to the PGW so as to limit the usable bandwidth for each of the mobile telephone terminals.

Figures 26, 27:
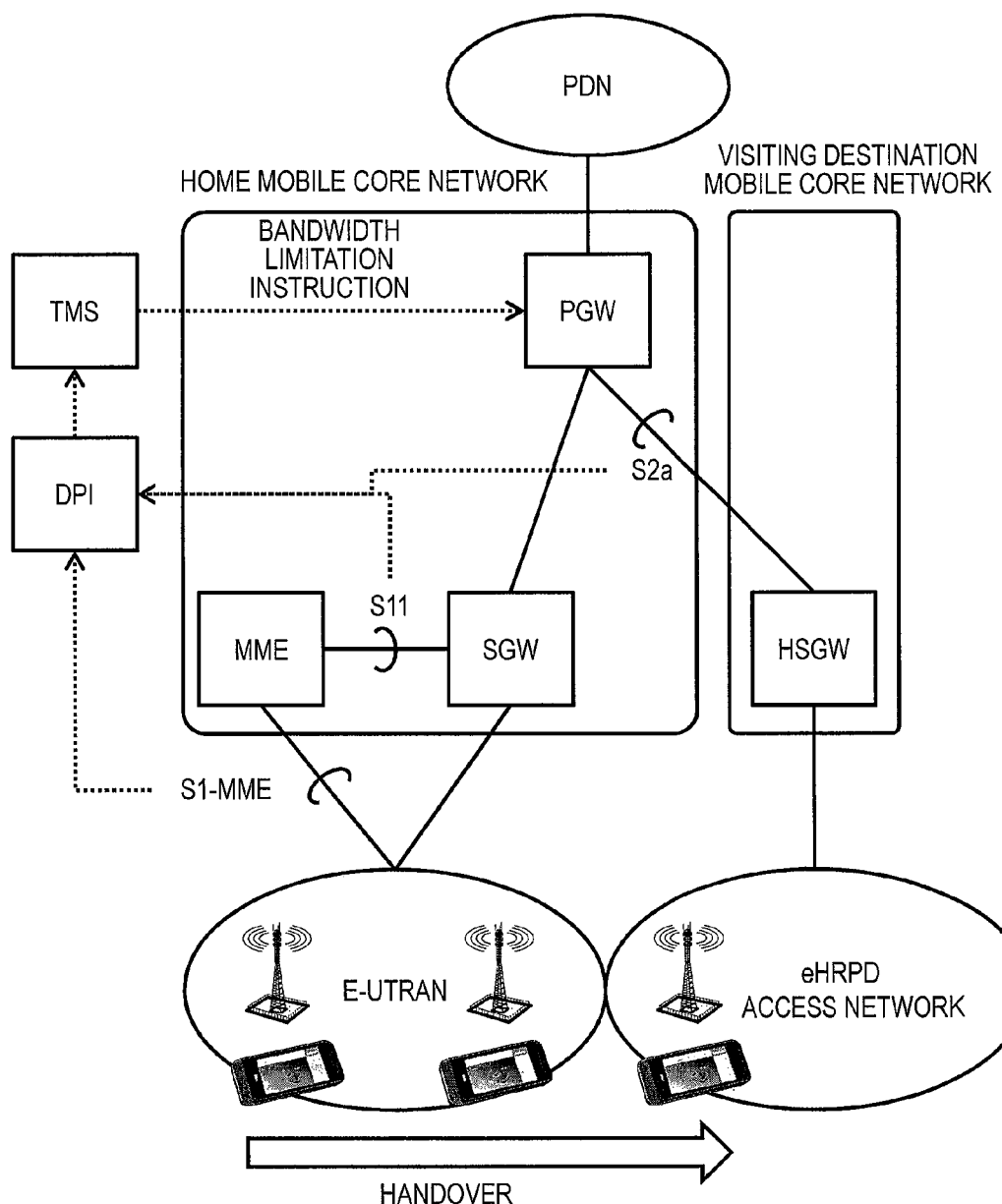
FIG. 26 illustrates an example of a configuration of the bandwidth limited subscriber information.
FIG. 27 illustrates an example of a configuration of an entire network system.

FIG. 26 illustrates an example of a configuration of the bandwidth limited subscriber information according to the present embodiment. The difference between the bandwidth limited subscriber information according to embodiment 1 and the bandwidth limited subscriber information according to the present embodiment includes a column to designate the bandwidth limitation for each entry. The TMS designates the bandwidth limitation corresponding to the maximum communication speed of the wireless access method of the base station at the destination of a handover for each terminal based on the terminal type information (FIG. 11).

For example, the TMS according to the present embodiment designates the bandwidth limitation' of the subscriber's mobile telephone terminal of the first entry which corresponds to LTE and HSPA+ to be 10 Mbps, and the bandwidth limitation of the subscriber's mobile telephone terminal of the second entry which corresponds to LTE and eHRPD to be 5 Mbps.

Accordingly, since the TMS according to the present embodiment is operable to designate the bandwidth limitation in a manner corresponding to the wireless access method with respect to the subscriber's mobile telephone terminal located within the coverage of the area boundary base station, when a handover occurs to the subscriber's mobile telephone terminal from an LTE base station other than the area boundary base station to an HSPA+ base station or an eHRPD base station via the area boundary base station, it becomes possible to minimize the total amount of packet loss by fixing the rate of change of the usable bandwidth for the subscriber's mobile telephone terminal. By this, it becomes possible to minimize the drop in quality of packet data communication experienced by the subscribers.

Note that the processing flow in which the TMS determines the area boundary base station, and the processing flow in which the TMS gives an instruction to the PGW to limit the usable bandwidth to each of the mobile telephone terminals located within the coverage of the area boundary base station are the same as those described in embodiments 1 and 2, and therefore, the description thereof will be omitted.

Embodiment 4

According to embodiment 4, an embodiment of the traffic management server designed to manage a roaming from the 3GPP E-UTRAN wireless access network of a first mobile business operator to a 3GPP2 eHRPD system wireless access network a second mobile business operator occurring to a subscriber's mobile telephone will be described.

FIG. 27 illustrates an example of a configuration of an entire network system according to the present embodiment. The present system includes the traffic management server (hereinafter, TMS), the packet detailed analysis apparatus (hereinafter, DPI), the mobile core network, the E-UTRAN wireless access network 103 designed to accommodate therein a mobile telephone terminal (hereinafter, E-UTRAN), the eHRPD wireless access network designed to accommodate therein a mobile telephone terminal (hereinafter, eHRPD network), and the packet data network (hereinafter, PDN). Further, the mobile core network includes the MME (Mobility Management Entity), the SGW (Serving Gateway), and the PGW (Packet data network Gateway), while a visiting destination mobile core network includes the HSGW (HRPD Serving Gateway).

The above stated DPI is designed to monitor the S11 I/F connecting the above stated MME with the above stated SGW, and tan S2a I/F connecting the above stated PGW with the above stated HSGW. Further, the DPI forwards a control message obtained by the two of the I/Fs to the TMS.

Further, the above stated TMS determines, based on the control message received from the DPI, the mobile telephone terminals located within a coverage of the base station to which a roaming from the E-UTRAN of the first mobile business operator to the eHRPD network of the second mobile business operator is occurring, and sends an instruction to the PGW so as to limit the usable bandwidth for each of the mobile telephone terminals.

FIG. 28 illustrates an example of a configuration of the roaming history information of the TMS according to the present embodiment. The TMS uses this information in order to manage the subscriber's mobile telephone terminal which is located within the coverage of the area boundary base station and which roamed. Each entry of this information includes a combination of time in which the TMS creates the entry or the TMS detects the roaming of a subscriber's mobile telephone terminal, the IMSI of subscriber's roaming mobile telephone terminal, and an HSGW ID (IP Address) designed to identify the HSGW of the roaming destination.

The present example according to the present embodiment includes roaming that occurs to 3 units of subscribers' mobile telephone terminals after the TMS starts monitoring the 3 units, and the identical HSGW at the destination of the roaming for all the units.

FIG. 29 illustrates an example of a configuration of the subscriber information within area boundary base station of the TMS according to the present embodiment. The TMS uses this information in order to manage as to under which base station's coverage the subscriber's mobile telephone terminal is located. Each entry of this information includes a combination of time in which the TMS detects a subscriber within a coverage, the IMSI of the subscriber's mobile telephone terminal, the S11 I/F MME side TEID, an IP address assigned to the subscriber's mobile telephone terminal, and the ECGI of the base station under the coverage of which the subscriber's mobile telephone terminal is located.

FIG. 30 illustrates an example of a configuration of the area boundary base station information of the TMS according to the present embodiment. The TMS uses this information in order to manage as to whether a roaming occurred to a subscriber's mobile telephone terminal at the mobile business operator's base stations. Each entry of this information includes a combination of time in which the entry is newly created or time in which the TMS detects a roaming occurring at a subscriber's telephone terminal, an identifier of the base station determined as the area boundary base station, the number of times roaming occurred per 1 hour, and a ratio of roaming occurring out of handovers that occurred.

FIG. 31 illustrates an example of a configuration of roaming business operator information of the TMS according to the present embodiment. The TMS uses this information in order to manage the type of wireless access network corresponding to each roaming business operator. Each entry of this information includes a combination of IP address block designed to indicate the roaming business operator's network, an operator name, an identifier designed to indicate whether or not the entry is compatible with LTE-A, an identifier designed to indicate whether or not the entry is compatible with HSPA+, and an identifier designed to indicate whether or not the entry is compatible with eHRPD.

The present example according to the present embodiment includes a roaming business operator compatible with eHRPD. That is, during roaming to this roaming business operator, a handover occurs from the LTE cell to the eHRPD compatible base station cell.

By referencing this roaming business operator information, it becomes possible for the TMS to designate usable bandwidth in a selective manner in accordance with the type of the wireless access network at the roaming destination. For example, it becomes possible to apply a bandwidth limitation wider than a mobile telephone terminal of the eHRPD system to a mobile telephone terminal of the HSPA+ system having a theoretical maximum communication speed higher than that of the eHRPD system.

Figure 32:
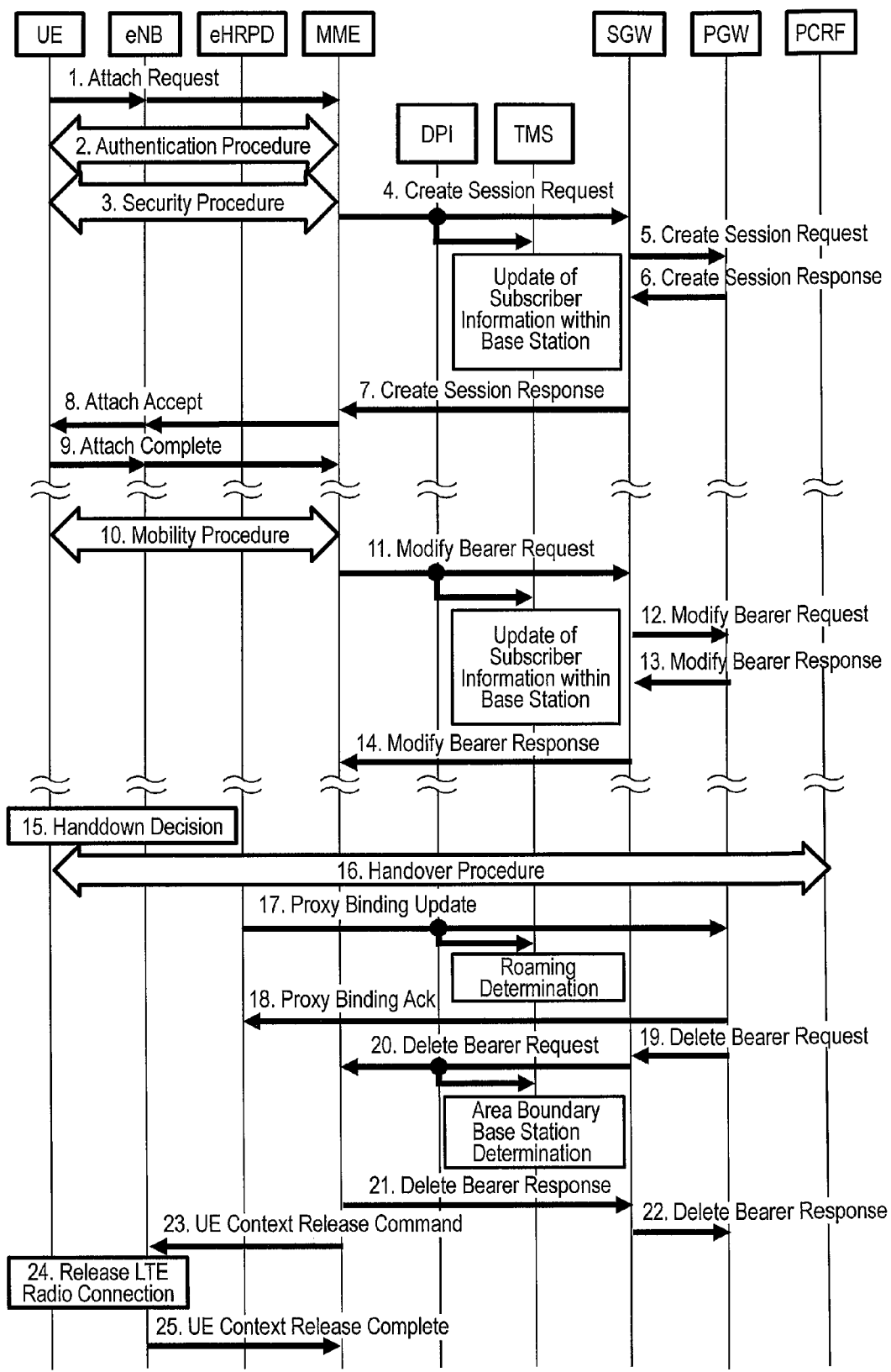
FIG. 32 illustrates an example of a message sequence which accompanies the area boundary base station determination executed by the TMS.

FIG. 32 illustrates an example of a message sequence which accompanies the area boundary base station determination executed by the TMS according to the present embodiment. Note that a sequence 1 to a sequence 14 of the message sequence in FIG. 32 are the same as those in FIG. 13.

In a sequence 15 the execution of a handdown is determined, and the handdown procedure is executed in a sequence 16. In a sequence 17 a Proxy Binding Update message is transmitted from the eHRPD to the PGW. At this point, the TMS obtains the Proxy Binding Update message via the DPI, and executes a roaming determination in accordance with the flows illustrated in FIG. 33 and FIG. 34, which will be described below.

In a sequence 18 a response is sent to the sequence 17, and a resource of the origin is released in a sequence 19. In a sequence 20 the Delete Bearer Request message, releasing the resource from the S-GW, is transmitted to the MME. At this point, the TMS obtains the Delete Bearer Request message via the DPI, and executes a determination on the area boundary base station in accordance with the flow illustrated in FIG. 33, which will be described below.

In a sequence 21 and a sequence 22, responses are sent to the sequence 19 and the sequence 20, and in a sequence 23, a sequence 24, and a sequence 25 LTE's wireless resource is released.

Figure 33:
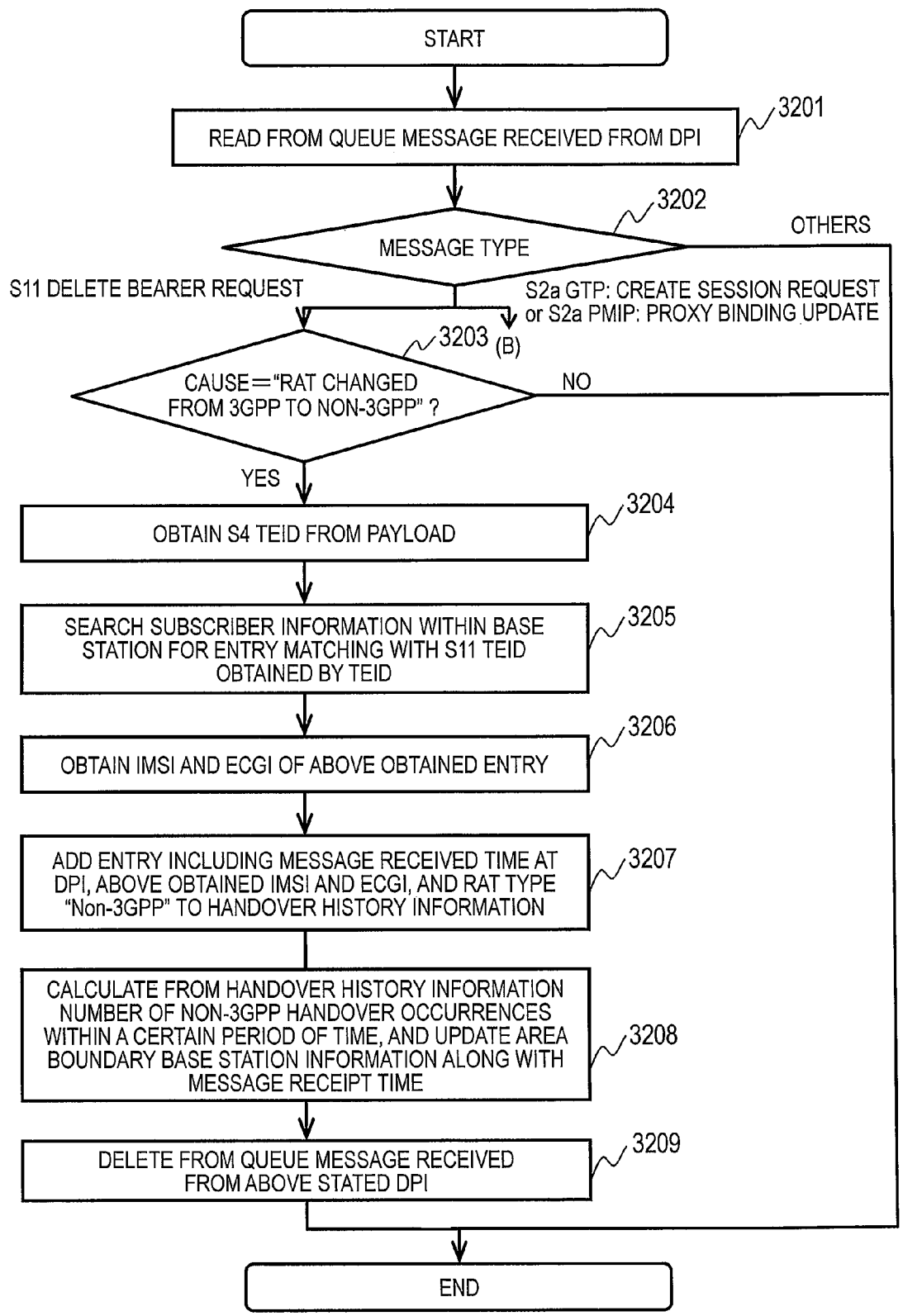
FIG. 33 illustrates an example of a flow of the area boundary base station determination executed by the TMS.

FIG. 33 illustrates an example of a flow of the area boundary base station determination executed by the TMS according to the present embodiment. In Step 3201, the TMS reads from the queue a message received from the DPI, and in Step 3202, the TMS determines the message type based on the header information of the received message.

After determining the message type as the S11 Delete Bearer Request, the TMS makes a determination as to whether or not the cause, which is the information element of the message, includes RAT changed from 3GPP to Non-3GPP in Step 3203. When it is determined the cause does not include the RAT changed from 3GPP to Non-3GPP in Step 3203, the present processing flow ends. When it is determined the cause includes the RAT changed from 3GPP to Non-3GPP in Step 3203, in Step 3204 the TMS obtains the S11 TEID from the payload of the message, and in Step 3205 the TMS searches the subscriber information within area boundary base station for an entry having the matching S11 TEID obtained above. In Step 3206, the TMS obtains the IMSI and the ECGI of the entry obtained above, and in Step 3207 the TMS adds an entry including a message reception time at the DPI, the IMSI and the ECGI obtained above, and the RAT type "Non-3GPP" to the handover history information. In Step 3208, the TMS calculates the number of Non-3GPP handovers occurring within a predetermined period of time from the handover history information, and updates the area boundary base station information combined with the message reception time. In Step 3209, the TMS deletes from the queue the received message received from the DPI.

After determining the message type as S2a GTP: Create Session Request or S2a PMIP: Proxy Binding Update in Step 3203, the TMS executes the processing flow illustrated in FIG. 34 which will be described below. When the message type to be anything else, the TMS ends the present processing flow.

Figure 34:
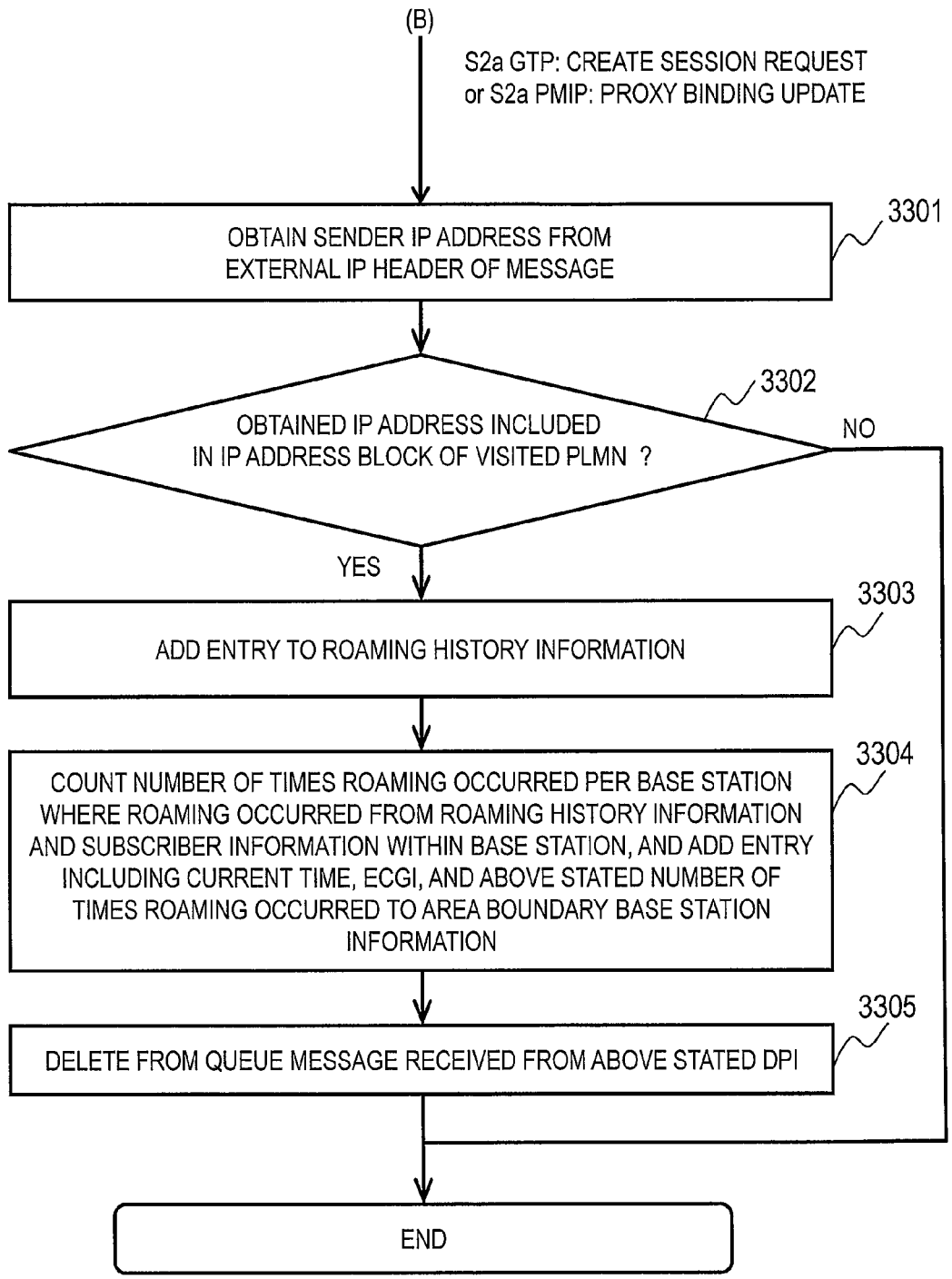
FIG. 34 illustrates an example of the flow of the area boundary base station determination executed by the TMS.

FIG. 34 illustrates an example of the flow of the area boundary base station determination executed by the TMS according to the present embodiment when the message type is determined as the S2a GTP: Create Session Request or the S2a PMIP: Proxy Binding Update.

The TMS obtains from an external IP header of the message an IP address of the sender in Step 3301, and in Step 3302 the TMS makes a determination as to whether the IP address obtained above is included in the IP address block of Home PLMN. When the IP address obtained above is not included in the IP address block of Home PLMN, the TMS ends the present processing flow.

When it is determined in Step 3302 that the IP address obtained above is included in the IP address block at Visited PLMN (mobile business operator at the visiting destination), in Step 3303 the TMS adds an entry including a combination of a message reception time at the DPI, the IMSI included in the message, and the IP address obtained above to the roaming history information.

In Step 3304 the TMS counts based on the roaming history information and the subscriber information within area boundary base station the number of roaming occurrences at each base station at which roaming took place, and adds to the area boundary base station information an entry including a combination of current time, ECGI, and the above stated the number of roaming occurrences.

The TMS deletes from the queue the message received from the above stated DPI in Step 3305, and ends the present processing flow.

Note that the processing flow in which the TMS gives an instruction to the PGW to limit the usable bandwidth to each of the mobile telephone terminals located within the coverage of the area boundary base station is the same as that described in embodiment 1, and therefore, the description thereof will be omitted.

What is claimed is:

1. A traffic management server comprising:
    a memory storing programs; and
    a processor, coupled to the memory, configured to execute the programs, which when executed cause the processor to:
    obtain a control message between a first network node and a second network node included in a mobile network,
    obtain information from the control message and a time of the control message,
    determine a station identification based on the information obtained from the control message,
    among a plurality of first base stations, connected to the first network node and the second network node, and a plurality of second base stations, determine a first one of the first base stations from which a handover occurs to a first one of the second base stations having a slower maximum communication speed than a maximum communication speed of the first one of the first base stations, as an area boundary base station of the first base stations,
    wherein the area boundary base station is determined based on a number of occurrences of handovers of each of the first base stations to the second base stations within a predetermined period of time from the time of the control message,
    determine a terminal located within a coverage area of the area boundary base station, and
    instruct a control apparatus included in the mobile network to limit a maximum usable bandwidth of the determined terminal,
    wherein the station identification identifies the first one of the first base stations from which the handover occurs to the first one of the second base stations.

2. The traffic management server according to claim 1,
    wherein the first one of the second base stations having the slower maximum communication speed is an evolved high rate packet data (eHRPD) base station, and the first one of the first base stations from which the handover to the eHRPD base station occurs is an LTE base station,
    wherein the first network node is a Mobility Management Entity (MME), and the second network node is an serving gateway (SGW), and
    wherein the program, when executed, causes the processor to: obtain, based on the control message obtained from an S11 interface configured to connect the MME with the SGW, the information of the handover from the Long Term Evolution (LTE) base station to the eHRPD base station.

3. The traffic management server according to claim 1,
    wherein the first one of the second base stations having the slower maximum communication speed is an evolved high speed packet access (HSPA+) base station, and the first one of the first base stations from which the handover to the (HSPA+) base station occurs is an LTE base station,
    wherein the first network node is an MME, and the second network node is an SGW and an serving general packet radio service support node (SGSN), and
    wherein the program, when executed causes the processor to: obtain, based on the control message obtained from an S11 interface configured to connect the MME with the SGW, and an S4 interface configured to connect the MME with the SGSN, the information of the handover from the LTE base station to the HSPA+base station.

4. The traffic management server according to claim 1,
    wherein the plurality of first base stations are managed by a first mobile business operator,
    wherein the first one of the second base stations having the slower maximum communication speed is managed by a second mobile business operator different from the first mobile business operator, and
    wherein the program, when executed, causes the processor to obtain information of roaming from the first one of the first base stations to the first one of the second base stations as the information of the handover.

5. The traffic management server according to claim 4,
    wherein the first one of the first base stations is an LTE base station, and the first one of the second base stations is an eHRPD base station,
    wherein the first network node is an MME and PGW, and the second network node is an SGW and an HSGW, and
    wherein the program, when executed, causes the processor to obtain, based on the control message obtained from an S11 interface designed to connect the MME with the SGW, and an S2a interface designed to connect the PGW with the HSGW, the information of the handover from the LTE base station to the HSGW base station.

6. The traffic management server according to claim 1,
    wherein the processor is configured to set, based on terminal type information indicating a communication method corresponding to the terminal and a communication method of the first one of the second base stations having the slower maximum communication speed, the bandwidth to be limited.

7. The traffic management server according to claim 1,
    wherein the program, when executed, causes the processor to:
    obtain a control message indicating a new connection of a terminal and a control message indicating the handover between the first one of the first base stations and the first one of the second base stations travelling between the first network node and the second network node included in the mobile network,
    create, based on the control message indicating the new connection and the control message indicating the handover, a list including the area boundary base station,
    create, based on the control message indicating the new connection and the control message indicating the handover, a list including a connection destination base station for each terminal in connection with the mobile network, and create, based on the list indicating the area boundary base station and the list indicating the connection destination base station, a list including each terminal in connection with the area boundary base station, and determine the terminal located within the coverage of the area boundary base station.

8. A traffic management method comprising:

obtaining a control message between a first network node and a second network node included in a mobile network, obtaining information from the control message and a time of the control message, determining a station identification based on the information obtained from the control message, among a plurality of first base stations, connected to the first network node and the second network node, and a plurality of second base stations, determining a first one of the first base stations from which a handover occurs to a first one of the second base stations having a slower maximum communication speed than a maximum communication speed of the first one of the first base stations, as an area boundary base station of the first base stations, wherein the area boundary base station is determined based on a number of occurrences of handovers of each of the first base stations to the second base stations within a predetermined period of time from the time of the control message, determining a terminal located within a coverage area of the area boundary base station, and instructing a control apparatus included in the mobile network to limit a maximum usable bandwidth of the determined terminal, wherein the station identification identifies the first one of the first base stations from which the handover occurs to the first one of the second base stations.

9. The traffic management method according to claim 8, comprising, setting, based on terminal type information indicating a communication method corresponding to the terminal and a communication method of the first one of the second base stations having the slower maximum communication speed, the bandwidth to be limited.

10. The traffic management method according to claim 8, the method comprising, obtaining a control message indicating a new connection of a terminal and the control message indicating the handover between the first one of the first base stations and the first one of the second base stations travelling between the first network node and the second network node included in the mobile network, creating, based on the control message indicating the new connection and the control message indicating the handover, a list including the area boundary base station, creating, based on the control message indicating the new connection and the control message indicating the handover, a list including a connection destination base station for each terminal in connection with the mobile network, and creating, based on the list indicating the area boundary base station and the list indicating the connection destination base station, a list including each terminal in connection with the area boundary base station, and determining the terminal located within the coverage of the area boundary base station.

11. A non-transitory computer readable storage medium for storing instructions, which, when executed on a computer, cause the computer to perform processing for managing traffic, wherein the processing comprises:

obtaining a control message between a first network node and a second network node included in a mobile network, obtaining information from the control message and a time of the control message, determining a station identification based on the information obtained from the control message, among a plurality of first base stations, connected to the first network node and the second network node, and a plurality of second base stations, determining a first one of the first base stations from which a handover occurs to a first one of the second base stations having a slower maximum communication speed than a maximum communication speed of the first one of the first base stations, as an area boundary base station of the first base stations, wherein the area boundary base station is determined based on a number of occurrences of handovers of each of the first base stations to the second base stations within a predetermined period of time from the time of the control message, determining a terminal located within a coverage area of the area boundary base station, and instructing a control apparatus included in the mobile network to limit a maximum usable bandwidth of the determined terminal, wherein the station identification identifies the first one of the first base stations from which the handover occurs to the first one of the second base stations.

* * * * *